(12) United States Patent
Chen et al.

(10) Patent No.: US 7,177,944 B1
(45) Date of Patent: Feb. 13, 2007

(54) TRANS-COMPRESSION SELECTION AND CONFIGURATION IN MODEM OVER PACKET NETWORKS

(75) Inventors: Zhihui Chen, Trabuco Cyn, CA (US); Skantha Kandiah, Lake Forest, CA (US); Keith Chu, Laguna Niguel, CA (US)

(73) Assignee: Mindspeed Technologies, Inc., Newport Beach, CA (US)

( * ) Notice: Subject to any disclaimer, the term of this patent is extended or adjusted under 35 U.S.C. 154(b) by 994 days.

(21) Appl. No.: 10/229,439

(22) Filed: Aug. 27, 2002

Related U.S. Application Data

(60) Provisional application No. 60/372,535, filed on Apr. 13, 2002.

(51) Int. Cl.
 *G06F 15/16* (2006.01)
 *G06F 15/177* (2006.01)
 *H04L 12/28* (2006.01)

(52) U.S. Cl. .................. 709/237; 370/401; 379/900; 709/222; 709/228

(58) Field of Classification Search ........ 370/352–356, 370/400–401; 379/900; 709/220–222, 227–228, 709/237, 249
See application file for complete search history.

(56) References Cited

U.S. PATENT DOCUMENTS

| | | | | |
|---|---|---|---|---|
| 5,452,287 A * | 9/1995 | DiCecco et al. | ............ | 370/236 |
| 5,546,395 A * | 8/1996 | Sharma et al. | .............. | 370/468 |
| 5,724,355 A * | 3/1998 | Bruno et al. | ................ | 370/401 |
| 6,023,470 A * | 2/2000 | Lee et al. | .................... | 370/401 |
| 6,175,856 B1 * | 1/2001 | Riddle | ........................ | 709/204 |
| 6,434,169 B1 * | 8/2002 | Verreault | .................... | 370/522 |
| 6,438,105 B1 * | 8/2002 | Qarni et al. | ................ | 370/231 |
| 6,449,285 B1 * | 9/2002 | Mills | .......................... | 370/466 |
| 6,463,135 B2 * | 10/2002 | Abrishami et al. | .... | 379/100.01 |
| 6,584,110 B1 * | 6/2003 | Mizuta et al. | .............. | 370/401 |
| 6,618,165 B1 * | 9/2003 | Sehgal | ....................... | 358/1.15 |
| 6,671,367 B1 * | 12/2003 | Graf et al. | ................. | 379/229 |
| 6,832,254 B1 * | 12/2004 | Scoggins et al. | ........... | 709/227 |
| 6,868,080 B1 * | 3/2005 | Umansky et al. | ........... | 370/354 |
| 6,965,600 B2 * | 11/2005 | George | ........................ | 370/392 |
| 6,970,430 B2 * | 11/2005 | Guven et al. | ............... | 370/252 |
| 7,006,490 B2 * | 2/2006 | Hagirahim | ................... | 370/352 |
| 7,042,833 B1 * | 5/2006 | George et al. | ............. | 370/216 |
| 2001/0005372 A1 * | 6/2001 | Cave et al. | ................ | 370/401 |

(Continued)

*Primary Examiner*—David Wiley
*Assistant Examiner*—George C. Neurauter, Jr.
(74) *Attorney, Agent, or Firm*—Farjami & Farjami LLP

(57) ABSTRACT

An apparatus and method for configuring a gateway device for a modem over packet network session is disclosed. For example, a system may include a first gateway device coupled to a first client device and a second gateway device coupled to a second client device, where the first gateway device is coupled to the second gateway device over a packet network. The trans-compression types and capabilities of the first and second gateway devices are determined and used to generate a set of negotiation parameters. The first gateway device then negotiates with the first client device using the negotiation parameters to select a first compression algorithm. A second compression algorithm selected between the second gateway device and the second client devices is also determined by the first gateway device. Then, the trans-compression mode of operation of the first gateway device is configured based on the trans-compression types and capabilities of the first and second gateway devices and the selected first and second compression algorithms. The second gateway device may be similarly configured.

41 Claims, 20 Drawing Sheets

U.S. PATENT DOCUMENTS

2002/0064137 A1* 5/2002 Garakani et al. ........... 370/278
2002/0064168 A1* 5/2002 Garakani et al. ........... 370/410
2002/0085501 A1* 7/2002 Guven et al. ............... 370/252
2003/0095544 A1* 5/2003 Chu ........................... 370/352
2003/0112796 A1* 6/2003 Kwan ......................... 370/352
2003/0123097 A1* 7/2003 Fruth ......................... 358/400
2003/0123466 A1* 7/2003 Somekh et al. ............. 370/401

* cited by examiner

TRANS-COMPRESSION SELECTION AND CONFIGURATION IN MODEM OVER PACKET NETWORKS

RELATED APPLICATIONS

The present application claims the benefit of U.S. provisional application Ser. No. 60/372,535, filed Apr. 13, 2002, which is hereby fully incorporated by reference in the present application.

BACKGROUND OF THE INVENTION

1. Field of the Invention

The present invention relates generally to communications over packet networks. More particularly, the present invention relates to transferring compressed data over a packet network, such as the Internet, utilizing the Internet Protocol ("IP").

2. Related Art

In recent years, packet-based networks, such as the Internet, have begun to replace the traditional analog telephone networks for transportation of voice and data. For example, with the emergence of voice over IP ("VoIP"), telephone conversations may now be captured, packetized and transported over the Internet. In a conventional VoIP system, telephone conversations or analog voice may be transported over the local loop or the public switch telephone network ("PSTN") to the central office ("CO"). From the CO, the analog voice is transported to a gateway device at the edge of the packet-based network. The gateway device converts the analog voice or speech to packetized data using a codec (coder/decoder), according to one of various existing protocols, such as G.729, G.711, G.723.1, etc. Next, the packetized data is transmitted over the Internet using the Internet Protocol for reception by a remote gateway device and conversion back to analog voice.

Today, many have diverted their focus to using the existing packet-based network and gateway devices, which have been designed to support the transportation of analog voice or speech over IP, to further support modem communication over IP, or as it is referred to in the industry, Modem over Internet Protocol ("MoIP"). FIG. 1 illustrates a block diagram of a conventional communication model for MoIP based on a packet-based network, such as the Internet. As shown, communication model 100 includes first client communication device 110 in communication with first gateway communication device 120 over PSTN providing transmit and receive channels 112 and 114. Communication model 100 further includes second client communication device 150 in communication with second gateway communication device 140 over PSTN providing transmit and receive channels 144 and 142. Communication model 100 enables communications between first gateway communication device 120 and second gateway communication device 140 via a packet network 130 utilizing the Internet Protocol. The Internet Protocol implements the network layer (layer 3) of a network protocol, which contains a network address and is used to route a message to a different network or subnetwork. The Internet Protocol further accepts packets from the layer 4 transport protocol, such as Transmission Control Protocol ("TCP") or User Data Protocol ("UDP"), and adds its own header and delivers the data to the layer 2 data link protocol. TCP provides transport functions, which ensures that the total amount of bytes sent is received correctly at the other end. UDP, which is part of the TCP/IP suite, is an alternate transport that does not guarantee delivery. It is widely used for real-time voice and video transmissions where erroneous packets are not retransmitted.

For purposes of MoIP, communication devices 110, 120, 140 and 150 are capable of performing modem functions. The term modem stands for modulator-demodulator (i.e. digital-to-analog/analog-to-digital converter). Modem is a device that is capable of adapting a terminal or computer to an analog telephone line by converting digital pulses to audio frequencies and vice versa. Modems may support a variety of data modulation standards, such as ITU (International Telecommunications Union) standards: V.22bis, V.34, V.90 or V.92, etc. Communication devices 110, 120, 140 and 150 may also be cable or DSL modems, which are all digital and technically not modems, but referred to as modems in the industry. Typically, modems have built-in error correction, such as MNP2-4 or LAPM (or V.42) and data compression, such as MNP5, V.42bis or V.44. Modems are also capable of supporting various voice and facsimile standards.

Conventionally, the communication process for MoIP begins when first client modem (("M1") or first client communication device 110) calls first gateway modem (("G1") or first gateway communication device 120). As a result, G1 calls second gateway modem (("G2") or second gateway communication device 140), and G2 in turn calls second client modem (("M2") or second client communication device 150). In order to support VoIP in their default mode of operation, typically, G1 and G2 communicate in voice mode and are configured to use a compressed voice protocol, such as the ITU standard G.723.1. However, when M2 answers the incoming call from G2, M2 generates an answer tone, e.g. 2100 Hz, that causes G1 and G2 to switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the tones generated by M2 may propagate through G1 and G2 in a more intact manner in order to reach M1 at the other side.

One existing method provides for maintaining G1 and G2 in G.711 or modem pass through mode, such that M1 and M2 are able to handshake over packet network 130 and transfer data using G.711 packets using the Internet Protocol. However, such solution suffers from many problems, such as packet loss, jitter and delay, which cannot be tolerated by high-speed modems. To overcome such problems, modem connections are terminated locally such that M1 and G1 handshake and make a connection locally and, similarly, M2 and G2 handshake and make a connection locally.

As discussed above, today, most modems are capable of compressing/decompressing data to increase the effective data throughput. Conventional compression techniques used by modems include MNP5 (Microcom Networking Protocol 5) and ITU standards V.42bis or V.44. After M1 and G1 modems establish a connection, M1 compresses, packetizes and transmits data to G1 on line 112 and G1 receives, depacketizes and decompresses the data prior to packetizing the data for transmission over packet network 130. Similarly, after M2 and G2 modems establish a connection, M2 compresses, packetizes and transmits data to G2 on line 144 and G1 receives, depacketizes and decompresses the data prior to packetizing the data for transmission over packet network 130. As a result, uncompressed data will be transported over packet network 130. However, it is, of course, highly desirable to transport compressed data over packet network 130 to increase the effective data rate. Various examples of transporting compressed data over a packet network are described in a co-pending patent application, assigned to the same assignee of the present application, entitled "Data Compression over Packet Networks", having U.S. patent application Ser. No. 10/004,655, filed Dec. 4, 2001, which is incorporated herein by reference.

Presently, there is an intense need in the art for an efficient and comprehensive compression selection procedure for use by gateway devices communicating over a packet network.

SUMMARY OF THE INVENTION

In accordance with the purposes of the present invention as broadly described herein, there is provided an apparatus and method for configuring a first gateway device for a modem over packet network session. The first gateway device is communicatively coupled to a first client device and a second gateway device, the second gateway device further communicatively coupled to a second client device. The first and second gateway devices are communicatively coupled to each other over a packet network, such as the Internet, for example.

In accordance with one embodiment of the invention, the method for configuring the first gateway device comprises: determining a first trans-compression type of the first gateway device; receiving, from the second gateway, a second trans-compression type of the second gateway device; generating first negotiation parameters for the first gateway device based on the first and second trans-compression types; and negotiating with the first client device to select a first compression algorithm After the compression algorithm is established between the first client device and the first gateway device, the first gateway modem is then configured to receive a second compression algorithm selected between the second gateway device and the second client device. The trans-compression mode of operation of the first gateway device is then configured based on the first and second trans-compression types and the first and second compression algorithms. The second gateway device can be configured in a manner similar to that described above for the first gateway modem.

After the trans-compression modes of operation of the first and second gateway devices are configured, the first and second gateway devices provide data exchange between the first and second client device in accordance with the defined trans-compression modes of operation configured for the gateway devices.

According to another aspect of the present invention, the trans-compression types of the first and second gateway devices are at least one of: no trans-compression ("NTCX"), single trans-compression ("STCX"), or double trans-compression ("DTCX"). The first negotiation parameters are then based on the first and second gateway devices being one of one of the NTCX type, the STCX type and the DTCX type. An example of the configuration method of the present invention based on these trans-compression types is provided in more detail below.

According to another aspect of the invention, the trans-compression mode of operation of the first gateway device is defined according to the trans-compression types of the first and second gateway devices, the compression capabilities of the first and second gateway devices, and the first and second modem compression algorithms.

According to another embodiment of the invention, at least one of the first and second gateway devices is able to perform compression negotiation for a compression protocol supported by the other gateway device but not by the one gateway device.

These and other aspects of the present invention will become apparent with further reference to the drawings and specification, which follow. It is intended that all such additional systems, methods, features and advantages be included within this description, be within the scope of the present invention, and be protected by the accompanying claims.

BRIEF DESCRIPTION OF THE DRAWINGS

The features and advantages of the present invention will become more readily apparent to those ordinarily skilled in the art after reviewing the following detailed description and accompanying drawings, wherein.

DETAILED DESCRIPTION OF THE INVENTION

The present invention may be described herein in terms of functional block components and various processing actions. It should be appreciated that such functional blocks may be realized by any number of hardware components and/or software components configured to perform the specified functions. For example, the present invention may employ various integrated circuit components, e.g., memory elements, digital signal processing elements, logic elements, and the like, which may carry out a variety of functions under the control of one or more microprocessors or other control devices. Further, it should be noted that the present invention may employ any number of conventional techniques for data transmission, signaling, signal processing and conditioning, tone generation and detection and the like. Such general techniques that may be known to those skilled in the art are not described in detail herein.

It should be appreciated that the particular implementations shown and described herein are merely exemplary and are not intended to limit the scope of the present invention in any way. For example, although the present invention is described using a modem over IP network, it should be noted that the present invention may be implemented in other communication networks and is not limited to modem over IP. Indeed, for the sake of brevity, conventional data transmission, compression/decompression, error-correction, encoding, decoding, signaling and signal processing and other functional aspects of the data communication system (and components of the individual operating components of the system) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical communication system.

Figure 1:
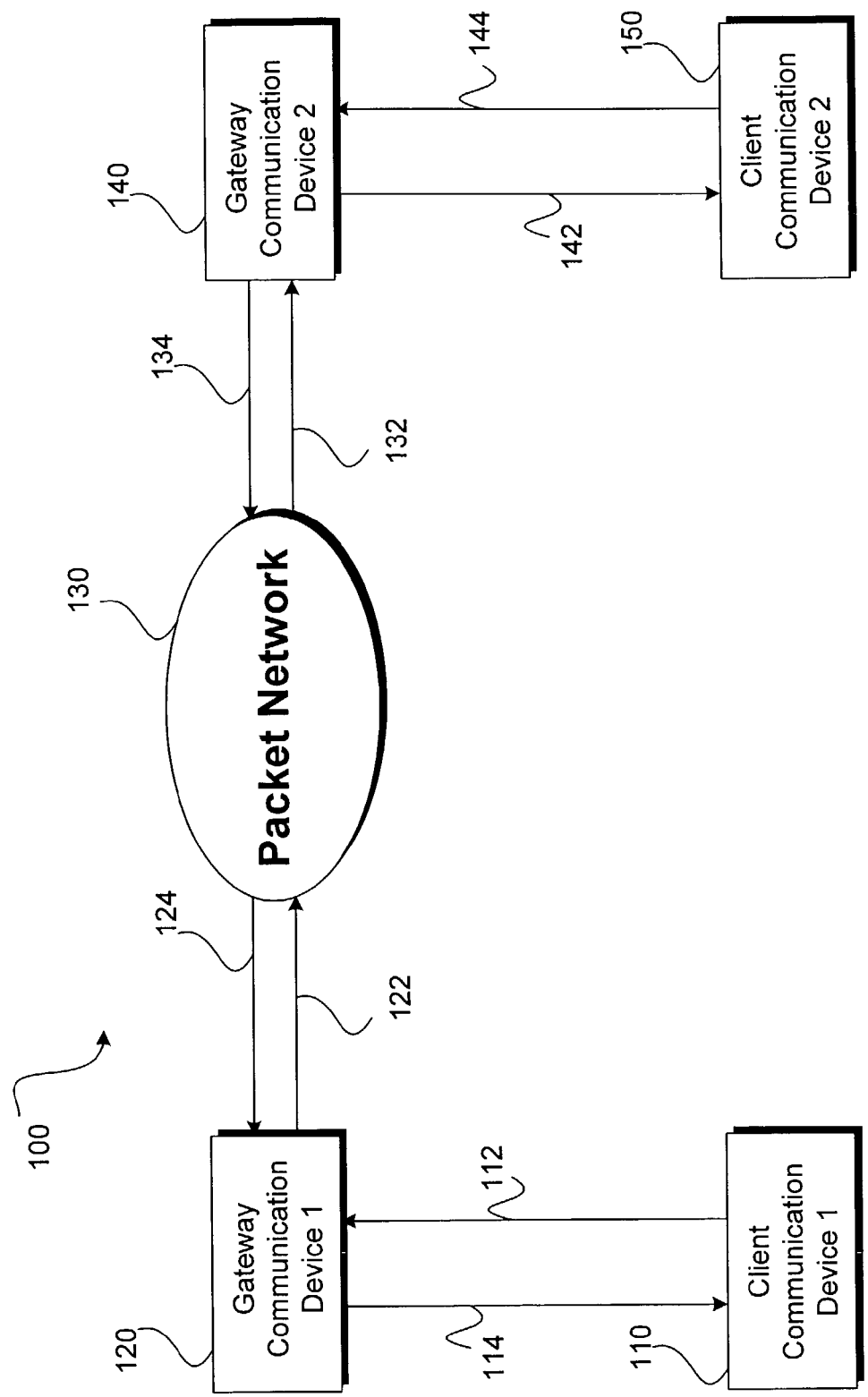
FIG. 1 illustrates a block diagram of a prior art communication model based on a packet network, such as the Internet, utilizing the Internet Protocol.
Figure 2:
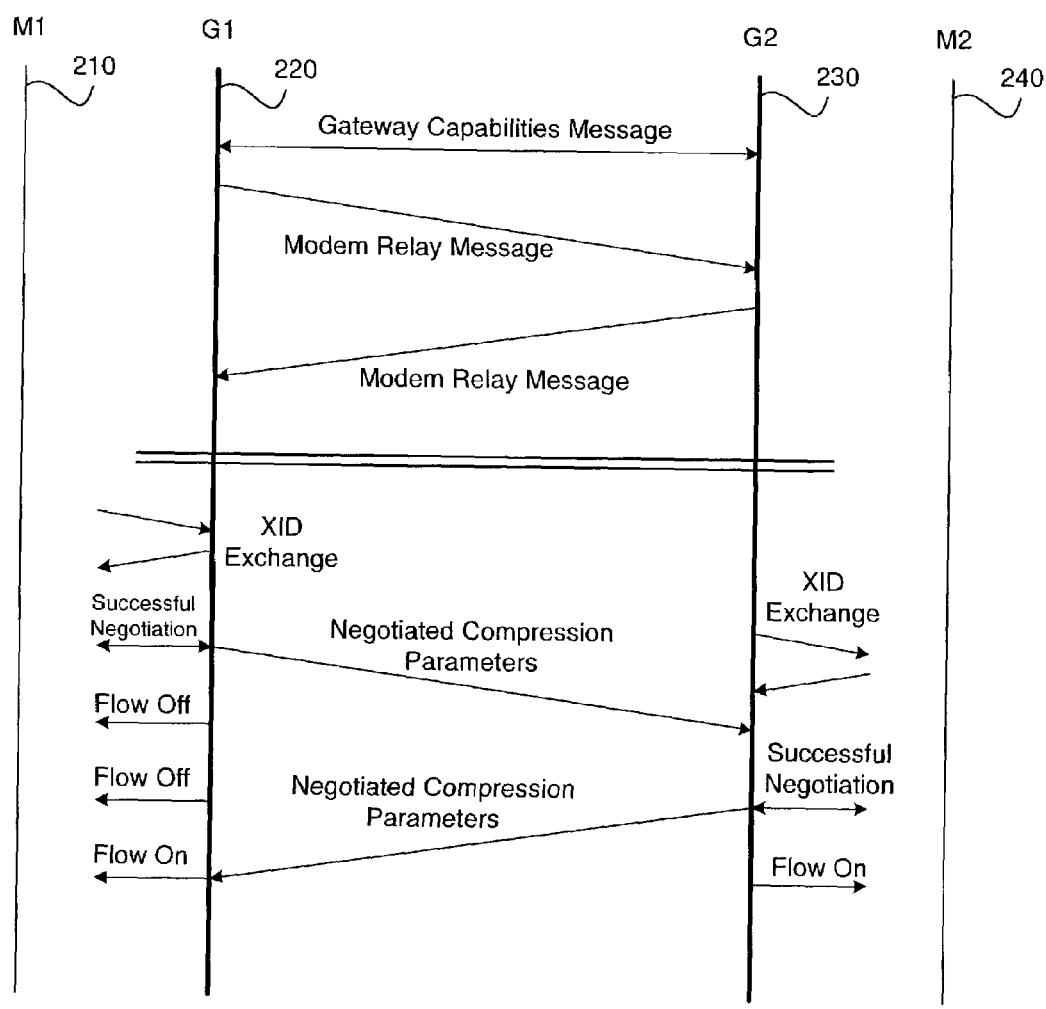
FIG. 2 illustrates a flow diagram of a data compression selection protocol for configuring gateway modems, according to one embodiment of the present invention.
Figures 1, 3:
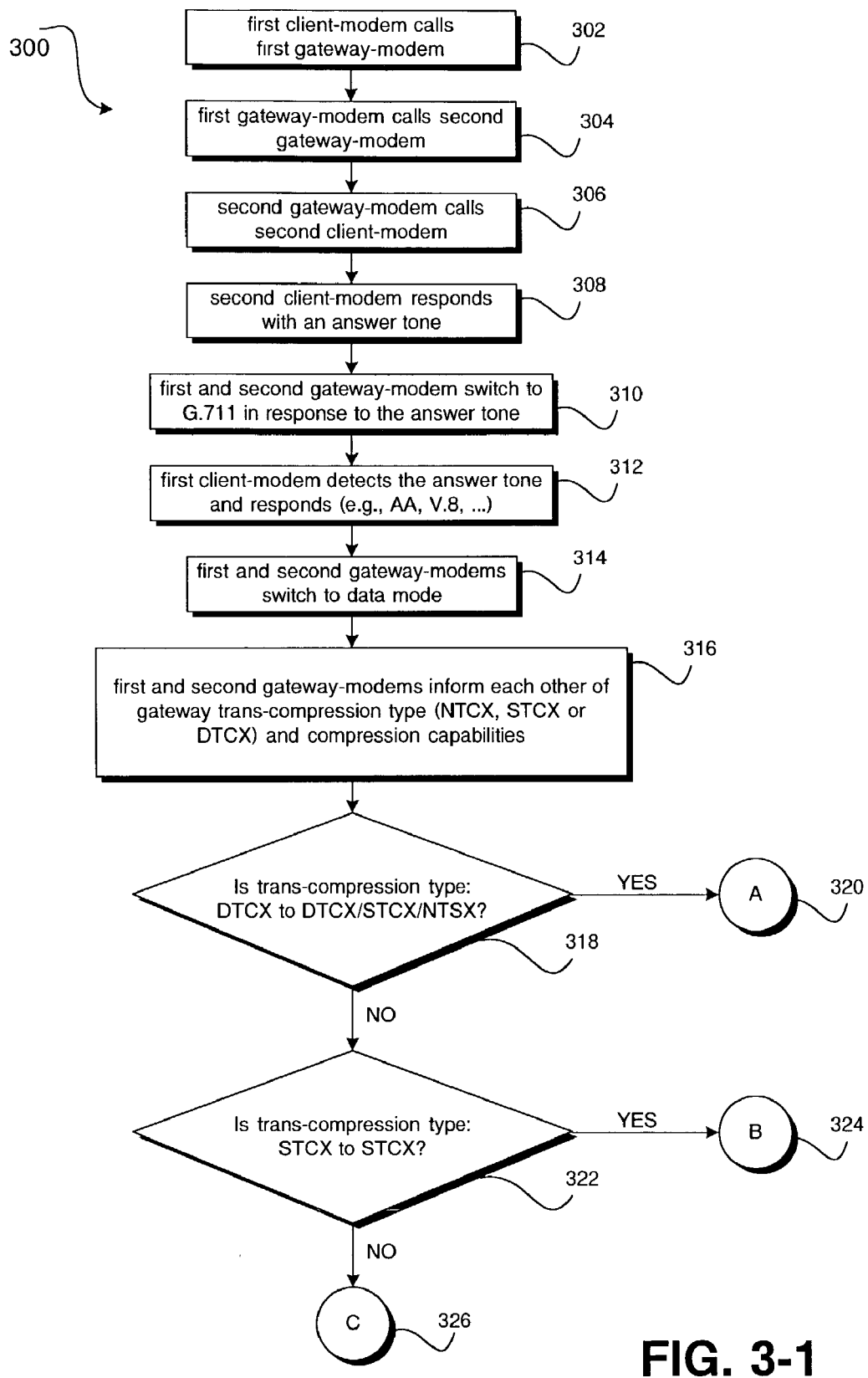
FIG. 3 illustrates a flow chart of a data compression selection protocol for configuring gateway modems, according to one embodiment of the present invention.
Figures 2, 3:
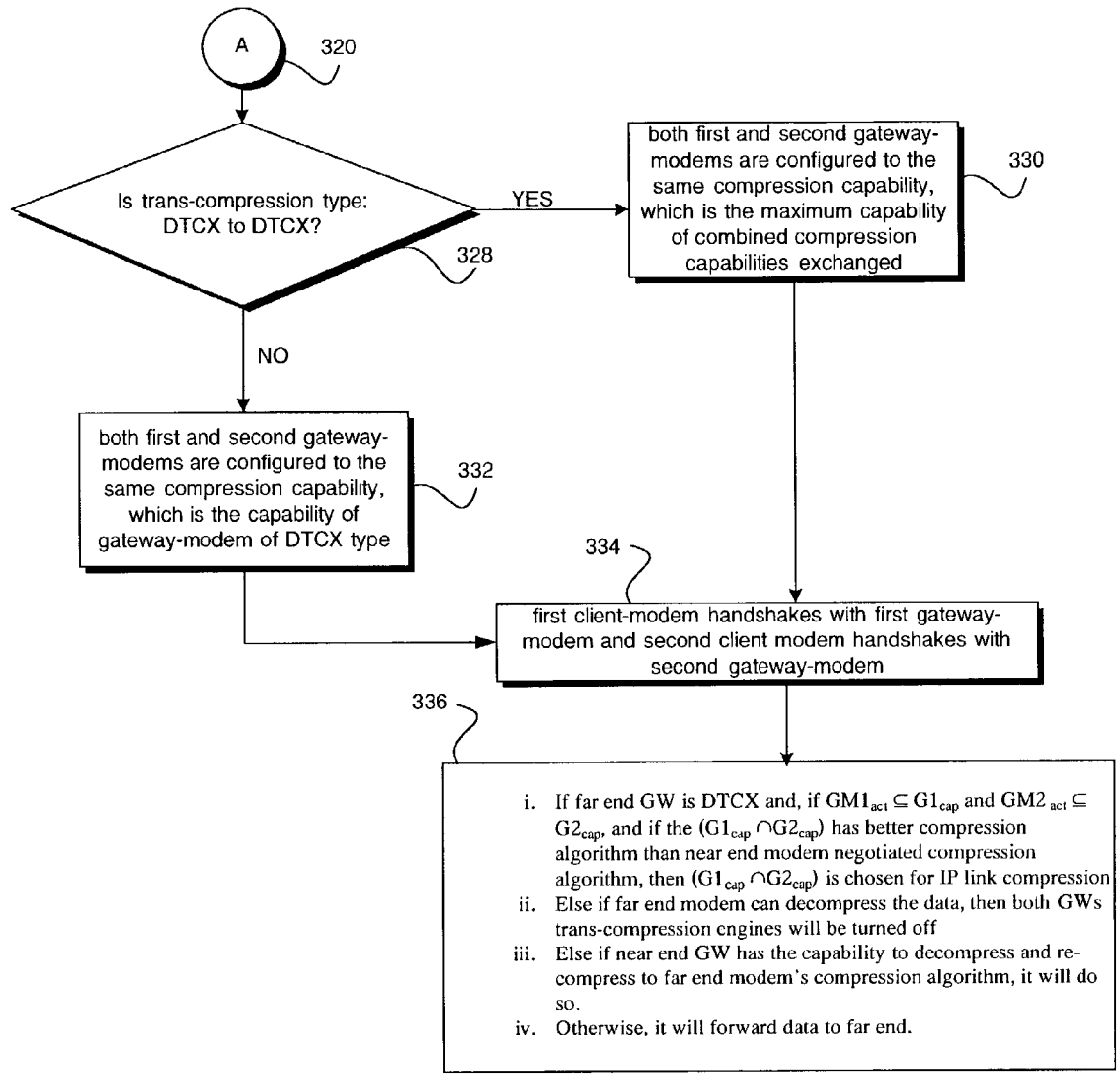
Figure 3:
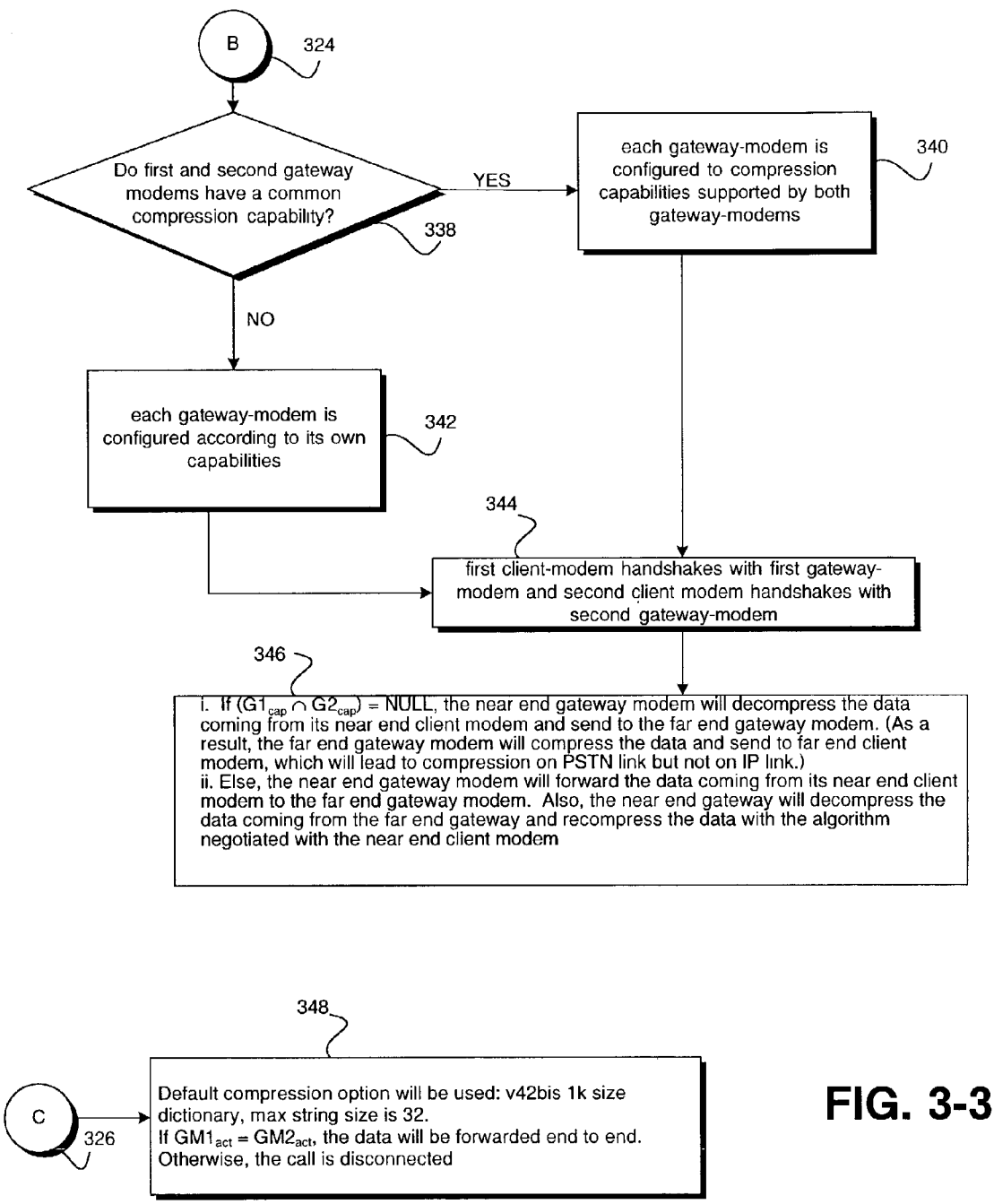

FIG. 2 illustrates a flow diagram of an exemplary communication system, according to one embodiment of the present invention based on a packet network environment utilizing the Internet Protocol. FIG. 3 illustrates a flow chart detailing exchanges between client modems and gateway modems in the exemplary communication system, according to one embodiment of the present invention. As shown, communication method 300 begins at block 302, when first client communication device or first client modem 210 calls first gateway communication device or first gateway modem 220 over a communication line, such as a telephone line. In response, in block 304, first gateway modem 220 calls or contacts second gateway communication device or second gateway modem 240 over a packet network. As a result, in block 306, second gateway modem 230 calls second client communication device or second client modem 240 over a communication line, such as a telephone line.

Typically, as their default mode of operation, first and second gateway modems 220 and 230 communicate in voice mode and use a compressed voice protocol, such as a speech protocol based on the ITU standard G.723.1. However, when second client modem 240 answers the incoming call from second gateway modem 230, second client modem 240 generates an answer tone, e.g. 2100 Hz, that causes first and second gateway modems 220 and 230 to switch to an uncompressed voice protocol, such as an ITU standard G.711, which provides toll quality audio at 64 Kbps using either A-Law or mu-Law pulse code modulation methods. This uncompressed digital format is used in order to allow easy connections to legacy telephone networks. By switching to G.711, the answer tone generated by second client modem 240 may propagate through second gateway modem 230 and first gateway modem 220 in a more intact manner in order to reach first client modem 210.

In block 312, upon detection of the answer tone by first client modem 210, first client modem 210 responds based on its current setting or mode of operation. For example, if first client modem 210 is a V.90 modem and the answer tone indicates that second client modem 240 supports a V.90 data modulation protocol, first client modem 210 may respond by transmitting a V.8 signal. In another mode, first client modem 210 may respond by transmitting an AA signal. All such signals are described in various ITU standards and are known to those of ordinary skill in the art and are contemplated for use in conjunction with the present invention. Now, in block 314, first and second gateway modems 220 and 230 detect the modem signals transmitted by first client modem 210 and, at this point, first and second gateway modems 220 and 230 switch to data mode to accommodate a modem connection. It should be noted that first and second gateway modems 220 and 230 may use a variety methods to switch from voice mode to data mode; for example, first gateway modem 220 may look for and detect a specific modem signal from first client modem 210 and upon detection of such signal inform second gateway modem 230, so both first and second gateway modems 220 and 230 may timely switch to data mode.

In block 316, at any time prior to the start of modem handshakes between first client modem 210 and first gateway modem 220, on one hand, and between second client modem 240 and second gateway modem 230, on the other hand, first gateway modem 220 and second gateway modem 230 inform each other of their own trans-compression type and data compression capabilities ($G1_{cap}$ and $G2_{cap}$) such as compression protocols including parameters for each protocol. Trans-compression type of a gateway modem may be one of (1) no trans-compression ("NTCX"), (2) single trans-compression ("STCX"), or (3) double trans-compression ("DTCX"). An NTCX gateway modem does not compress data between either such gateway modem and a remote gateway modem nor between such gateway modem and its local client gateway modem. An STCX gateway modem can only run compression/decompression in one direction. A DTCX gateway modem, however, can run compression/decompression in both directions, i.e. it includes two compression/decompression engines.

Further, first gateway modem 220 and second gateway modem 230 may exchange data packets, over the packet network, which data packets include parameters indicating support for MNP5, V.42bis and/or V.44 data compression. In addition, the parameters may include data compression dictionary size, string length, etc. and other capabilities of the compression techniques supported by each first and second gateway modems 220 and 230. The parameters may also include any and all compression parameters that can be negotiated between the modems, including those negotiable parameters set forth in relevant specifications for V.42bis, MNP5 or V.44 protocols, which are hereby incorporated by reference. It should be noted that, in some embodiments, although a gateway modem may not support a certain compression technique, such gateway modem may still be able to perform the negotiations according to such unsupported compression technique for the benefit of the remote gateway modem. For example, if first gateway modem 220 does not support V.44, but second gateway modem 230 does support V.44, under some circumstances, as described below, first gateway modem 220 may perform the appropriate XID exchange with first client modem 210 to negotiate V.44 compression for support by second gateway modem 230 after negotiations end.

Next, in block 318, it is determined if trans-compression types of first gateway modem 220 and second gateway modem 230 is such that at least one is of DTCX type and the other is of any other type, such as DTCX, STCX or NTCX. If so, method 300 moves to state "A" 320, else at block 322 it is determined if both first gateway modem 220 and second gateway modem 230 are of the trans-compression type STCX. If so, method 300 moves to state "B" 324, else for all other trans-compression type scenarios for first gateway modem 220 and second gateway modem 230, method 300 moves to state "C" 326.

As shown, state "A" 320 moves to block 328, where it is determined if trans-compression types of first gateway modem 220 and second gateway modem 230 is such that they are both of DTCX type. If so, method 300 moves to block 330, where both first gateway modem 220 and second gateway modem 230 are configured to negotiate with their respective client modems based on the same compression capability using the maximum capability of combined compression capabilities exchanged between first gateway modem 220 and second gateway modem 230 at block 316, i.e., $G1_{nego} = G2_{nego} = \max(G1_{cap}, G2_{cap})$. For example, if first gateway modem 220 is capable of supporting V.42bis and MNP5 (as exchanged at block 316) and second gateway modem 230 is capable of supporting V.44, V.42bis and MNP5 (as exchanged at block 316), then both first gateway modem 220 and second gateway modem 230 will negotiate with their respective local client modems based on V.44, V.42bis and MNP5 capabilities. In other words, although first gateway modem 220 does not support V.44 compression, but it will negotiate such compression technique, via appropriate XID exchanges, with first client modem 210 (assuming first client modem 210 supports V.44).

In one embodiment, the maximum capability of combined compression capabilities is chosen according to the following priority scheme. First, the capabilities of the gateway modem supporting the most number of compression algorithms will be chosen. For example, if first gateway modem 220 supports V.42 and MNP5 and second gateway modem 230 supports MNP5, then V.42 and MNP5 will be chosen as the capabilities that will be used by each gateway modem to negotiate with its local modem. As a result, in the previous example, both first gateway modem 220 and second gateway modem 230 will negotiate V.42 and MNP5 compression with their respective client modems although second gateway modem 230 will not support V.42bis if it is actually negotiated between second gateway modem 230 and second client modem 240.

However, if both gateway modems 220 and 230 support the same number of compression algorithms, then, as a second priority test, the gateway modem with higher degree of compression capability will be selected according to the following: V.44>V.42bis>MNP5. For example, if first gateway modem 220 supports V.44/V.42bis and second gateway modems 230 supports V.42bis/MNP5, then V.44/V.42bis will be selected as the capabilities of both gateway modems 220 and 230 to be negotiated with its respective client modem. As a result, in the previous example, both first gateway modem 220 and second gateway modem 230 will negotiate V.44 or V.42bis compression with their respective client modems although second client modem 230 will not support V.44 if it is actually negotiated between second gateway modem 230 and second client modem 240.

Yet, if both gateway modems 220 and 230 support the same number of compression algorithms with the same degree of compression capability, then starting with the compression with the highest degree of compression (V.44>V.42bis>MNP5), it will be determined whether one gateway modem's compression parameters are a superset of the other gateway modem's parameters, but if one is not the superset of another, then the process moves to next compression algorithm and makes a similar determination. This process will continue until it is either determined that one gateway modem's compression parameters are a superset of the other gateway modem's parameters for the compression algorithm under test or the end of compression algorithm list is reached and neither side has the superset parameters. If one side is determined to have a superset of parameters, then that gateway modem's compression capabilities, including the parameters, are used by both gateway modems. However, if neither side has a superset of parameters, each gateway modem will use its own compression capability to negotiate with its respective client modem. For example, if both first gateway modem 220 and second gateway modem 230 support V.44, V.42bis and MNP5, then, the parameters of V.44 are compared, if the same, then parameters of V.42bis are compared, and if the same, then parameters of MNP5 are compared, and if the same, then each of gateway modems 220 and 230 will use its own compression capabilities to negotiate with its respective client modem. However, if the parameters of V.44 are compared and are the same, but the parameters of V.42bis are different, then compression capabilities of the gateway modem with better V.42bis parameters will be used by both gateway modems 220 and 230. As a further example, if the parameters of V.44 are compared and are the same, then the parameters of V.42bis are compared and are the same, but then the parameters of MNP5 are different, then compression capabilities of the gateway modem with better MNP5 parameters will be used by both gateway modems 220 and 230.

The parameters that may be considered for the purpose of comparison can include, dictionary size, history buffer size, string size, etc. For example, if first gateway modem 220 supports V.44 and V.42bis and second gateway modem 230 supports V.44 and V.42bis. Both gateway modems 220 and 230 will use first gateway modem's 220 capabilities to negotiate with their respective client modems if first gateway modem 220 has larger dictionary size, history buffer size and/or string size than those of second gateway modem 230.

Now, if at block 328, it is determined that the trans-compression types of first gateway modem 220 and second gateway modem 230 is such that one is of DTCX type and the other is of either STCX or NTCX type, then method 300 moves to block 332, where both first and second gateway modems 220 and 230 are configured to the same compression capability, which is the capability of the gateway modem of DTCX type. For example, if first gateway modem 220 is of DTCX type and supports MNP5 and second gateway modem 230 is of STCX type and supports V.44, at block 332, both first gateway modem 220 and second gateway modem 230 are configured to MNP5 for negotiation with their respective client modem.

Next, method 300 moves to block 334 from either block 330 or 332, where each gateway modem 220 and 230 "handshakes" with its respective client modem 210 and 240 using the negotiation parameters defined from either block 330 or 332 and establishes an "actual" modem-gateway compression algorithm (i.e., a physical connection (such as V.92, V.90, V.34, etc.) and a logical connection (such as error correction and compression protocol V.42/V.44, V.42/V.42bis or MNP4/MNP5, etc.)). For example, at block 334, first gateway modem 220 may negotiate a V.90 connection with V.42/V.44 protocol with first client modem 210, and second gateway modem 230 may negotiate a V.92 connection with V.42/V.42bis protocol with second client modem 240. At block 334, gateway modems 220 and 230 also exchange the actual compression algorithm and parameters negotiated with their respective client modems 210 and 240, i.e. $GM1_{act}$ and $GM2_{act}$.

At this point, method 300 moves to block 336, where each gateway modem 220 and 230 performs the following priority scheme in the order shown below to configure the trans-compression mode of operation of first gateway modem 220 and second gateway modem 230.

i. If (far end gateway modem is DTCX) and ($GM1_{act} \subseteq G1_{cap}$) and ($GM2_{act} \subseteq G2_{cap}$) and (($G1_{cap} \cap G2_{cap}$) > $GM1_{act}$), then ($G1_{cap} \cap G2_{cap}$) is used as compression algorithm to run between G1 and G2 over IP link. See FIG. 4A as an example.
  ii. Else if (far end client modem can decompress the data coming from near end client modem), then no decompression-compression is performed by the gateway modem on the data coming from the near end client modem. See FIG. 4B as an example.
  iii. Else if the gateway modem has the capability to decompress and recompress the data coming from near end client modem according to far end modem's compression algorithm, it will do so. See FIGS. 4C and 4D as examples.
  iv. Otherwise, the gateway modem will forward the data coming from near end client modem to far end gateway modem. See FIG. 4G as an example.

It should be noted that ($G1_{cap} \cap G2_{cap}$) > $GM1_{act}$) indicates that first gateway modem 220 and second gateway modem 230 are capable of negotiating a compression algorithm with a higher degree of algorithm that is actually negotiated at local ends (i.e., between first gateway modem 220 and the first client modem 210). For example, if first gateway modem 220 and first client modem 230 have negotiated V.42bis and the two gateway modems 220 and 230 are capable of V.44 compression, then $(G1_{cap} \cap G2_{cap}) > GM1_{act})$ is satisfied. The sign ">" indicates higher degree of compression based on V.44>V.42bis>MNP5 as well as parameters of each compression algorithm, as discussed above with respect to second and third priority tests in block 330 for determining the maximum capability.

As shown, state "B" 324 moves to block 338, where it is determined if first and second gateway modems 220 and 230 have any common compression capability, i.e. whether $G1_{cap} \cap G2_{cap}$ is not NULL. If first and second gateway modems 220 and 230 have a common compression capability, i.e. $G1_{cap} \cap G2_{cap}$ is not NULL, method 300 moves to block 340, where each gateway modem is configured according to common capabilities supported by gateway modems 220 and 230. For example, if first gateway modem 220 supports V.44 and V.42bis, and second gateway modem 230 supports V.42bis, then each gateway modem 220 and 230 is configured to V.42bis for negotiation with its respective client modem. However, if first and second gateway modems 220 and 230 do not have any common compression capability, i.e. $G1_{cap} \cap G2_{cap}$ is NULL, method 300 moves to block 342, where each gateway modem is configured according to its own compression capabilities for negotiation with its respective client modem. For example, if first gateway modem 220 supports V.44 and V.42bis, and second gateway modem 230 supports MNP5, then first gateway modem 220 is configured to negotiate V.44 or V.42bis with first client modem 210, and second gateway modem 230 is configured to MNP5 for negotiation with second client modem 240.

Next, method 300 moves to block 344 from either block 340 or 342, where each gateway modem 220 and 230 handshakes with its respective client modem 210 and 240 and establishes an actual modem-gateway compression algorithm (i.e., a physical connection (such as V.92, V.90, V.34, etc.) and a logical connection (such as error correction and compression protocol V.42/V.44, V.42/V.42bis or MNP4/MNP5, etc.)). For example, at block 344, first gateway modem 220 may negotiate a V.90 connection with V.42/V.44 protocol with first client modem 210, and second gateway modem 230 may negotiate a V.92 connection with V.42/V.42bis protocol with second client modem 240. At block 344, gateway modems 220 and 230 also exchange the actual compression algorithm and parameters negotiated with their respective client modems 210 and 240, i.e. $GM1_{act}$ and $GM2_{act}$.

At this point, method 300 moves to block 346, where each of gateway modems 220 and 230 performs the following priority scheme in the order shown below.
  i. If $(G1_{cap} \cap G2_{cap})$=NULL, the near end gateway modem will decompress the data coming from its near end client modem and send to the far end gateway modem. (As a result, the far end gateway modem will compress the data and send to far end client modem, which will lead to compression on PSTN link but not on IP link.)
  ii. Else, the near end gateway modem will forward the data coming from its near end client modem to the far end gateway modem. Also, the near end gateway will decompress the data coming from the far end gateway and recompress the data with the algorithm negotiated with the near end client modem.

As shown, state "C" 326 moves to block 348, where V.42bis with 1K dictionary size and maximum string size of 32 is used as an example default compression scheme. Further, if the actual negotiated compression between first gateway modem 220 and first client modem 210, on one hand, and second gateway modem 230 and second client modem 240, on the other hand, is the same, i.e. $GM1_{act}=GM2_{act}$, then each gateway modem 220 and 230 will forward the data as is to its local client modem and the other gateway modem.

Turning to FIG. 2, it should be noted that, one of gateway modems 220 or 230 may successfully achieve physical and logical connection prior to the other. For example, as shown in FIG. 2, first gateway modem 220 may connect to first client modem 210, e.g. V.90/V.42/V.44, prior to second gateway modem 230 connecting to second client modem 240. As a result, in one embodiment, first gateway modem 220 may flow off first client modem 210 (or prevent data exchange), until first gateway modem 220 receives information from second gateway modem 230 regarding the actual compression algorithm and parameters negotiated between second gateway modem 230 and second client modem 240. For example, in method 300, at blocks 334 and 344, first gateway modem 220 may flow off first client modem 210 and not move to blocks 336 and 346, respectively, until the actual compression algorithm and parameters negotiated are received from second gateway modem 230.

Figure 4A:
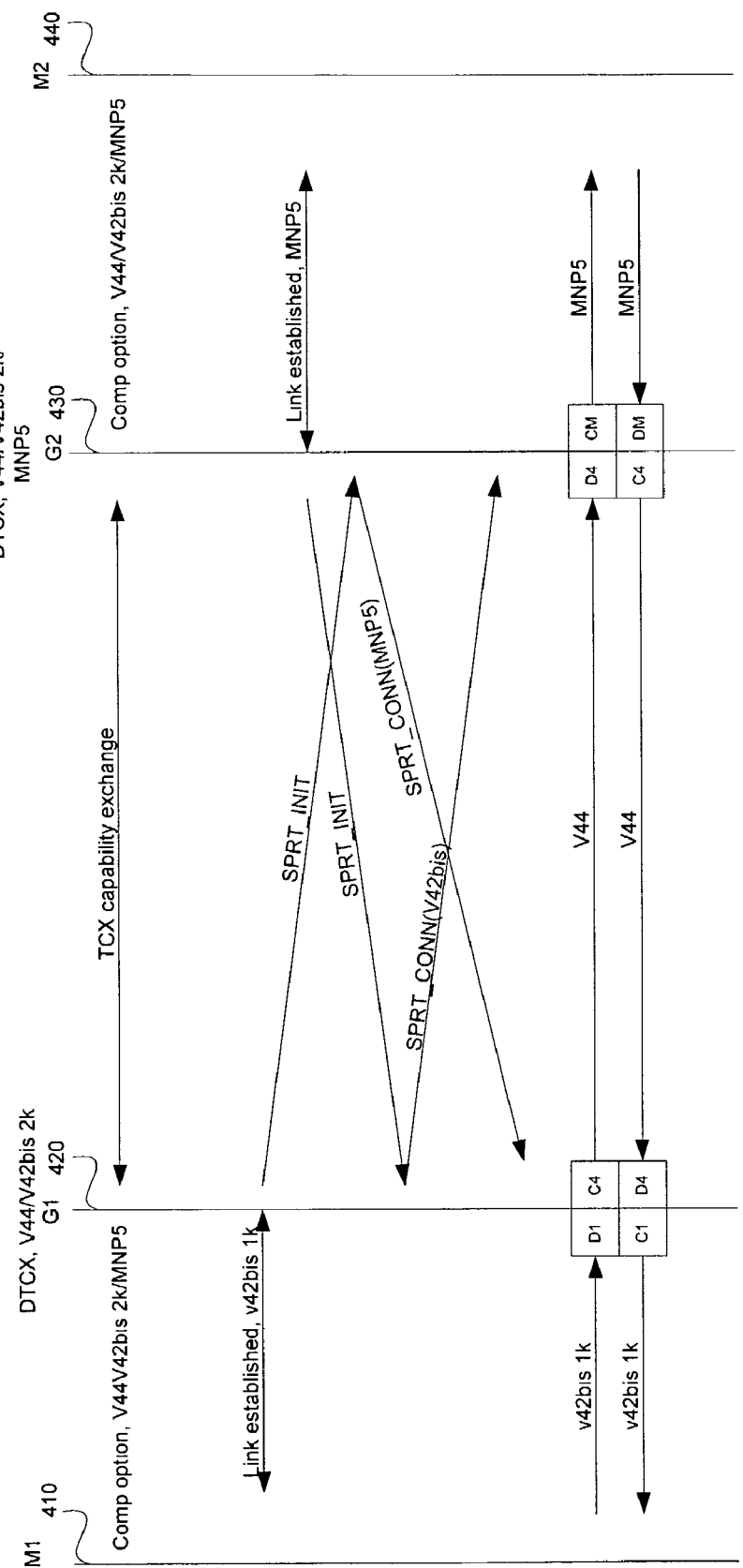
FIGS. 4A–4O illustrate exemplary block diagrams of modem data compression configurations achieved according to the flow chart of FIG. 3.

FIGS. 4A–4O illustrate some exemplary block diagrams of modem data compression and gateway trans-compression configurations achieved according to method 300 of FIG. 3. In FIGS. 4A–4O, CM will be used to represent MNP5 compression; DM will be used to represent MNP5 decompression; C1 will be used to represent V.42bis 1 k compression; D1 will be used to represent V.42bis 1 k decompression; C2 will be used to represent V.42bis 2 k compression; D2 will be used to represent. V.42bis 2 k decompression; C4 will be used to represent V.44 compression; and D4 will be used to represent V.44 decompression. The example configurations of FIGS. 4A–4O are only illustrative of the configuration method 300 of FIG. 3. The present invention is equally suitable for configuration of various other compression algorithms as well as for use with other gateway and modem hardware configurations.

FIG. 4A depicts an example arrangement where first gateway modem (G1) 420 is of DTCX type and supports compression protocols V.44 and V.42bis with 2 k dictionary size ("V.42bis 2 k"), and second gateway modem (G2) 430 is of DTCX type and supports compression protocols V.44, V.42bis 2 k and MNP5. Since both G1 420 and G2 430 are of DTCX type, the same compression negotiation parameters using the maximum combined capability between G1 420 and G2 430 are defined for each. In this example, the highest compression capabilities of each of the supported compression capabilities (V.44, V.42bis 2 k, and MNP5) are used as the negotiation parameters. These negotiation parameters and other data may be communicated between G1 420 and G2 using a communication protocol (e.g., such as the Simple Packet Relay Transport (SPRT) protocol as shown in FIGS. 4A through 4O). For example, in FIG. 4A, the negotiation parameters may be communicated via SPRT_INIT instructions. G1 420 and G2 430 then negotiate with its respective client modems (M1) 410, (M2) 440 using these defined compression negotiation parameters. As shown in FIG. 4A, an actual modem compression algorithm of V.42bis with 1 k dictionary size ("V.42bis 1 k") is established for the M1-G1 link, while an actual modem compression algorithm of MNP5 is established for the M2-G2 link. The compression algorithms may be communicated via SPRT_CONN instructions, for example. In this case, G1 420 and G2 430 are configured to use the highest common compression (V.44) for trans-compression between G1 420 and G2 430 since, as described above in conjunction with block 336i of FIG. 3-2:

(1) the far end gateway for each gateway is of DTCX type;
(2) the gateway compression capabilities of G1 420 (V.44, V.42bis 2 k) are a superset of the actual modem compression algorithm established between G1 420 and M1 410 (V.42bis 1 k) ($GM1_{act} \subseteq G1_{cap}$);
(3) the gateway compression capabilities of G2 430 (V.44, V.42bis 2 k, MNP5) are a superset of the actual modem compression algorithm established between G2 430 and M2 440 (MNP5) ($GM2_{act} \subseteq G2_{cap}$); and
(4) the highest common compression capability between G1 420 and G2 430 (V.44) is a higher degree compression than the actual compression algorithm established between G1 420 and M1 410 (($G1_{cap} \cap G2_{cap}$)>$GM1_{act}$) (V.44>V.42bis 1 k) for G1 420; similarly, ($G1_{cap} \cap G2_{cap}$)>$GM2_{act}$, for G2 430) (V.44>MNP5).

Thus, trans-compression mode of operation between G1 420 and G2 430 is configured for V.44 for each of the G1 420 and G2 430, as shown in FIG. 4A.

Figure 4B:
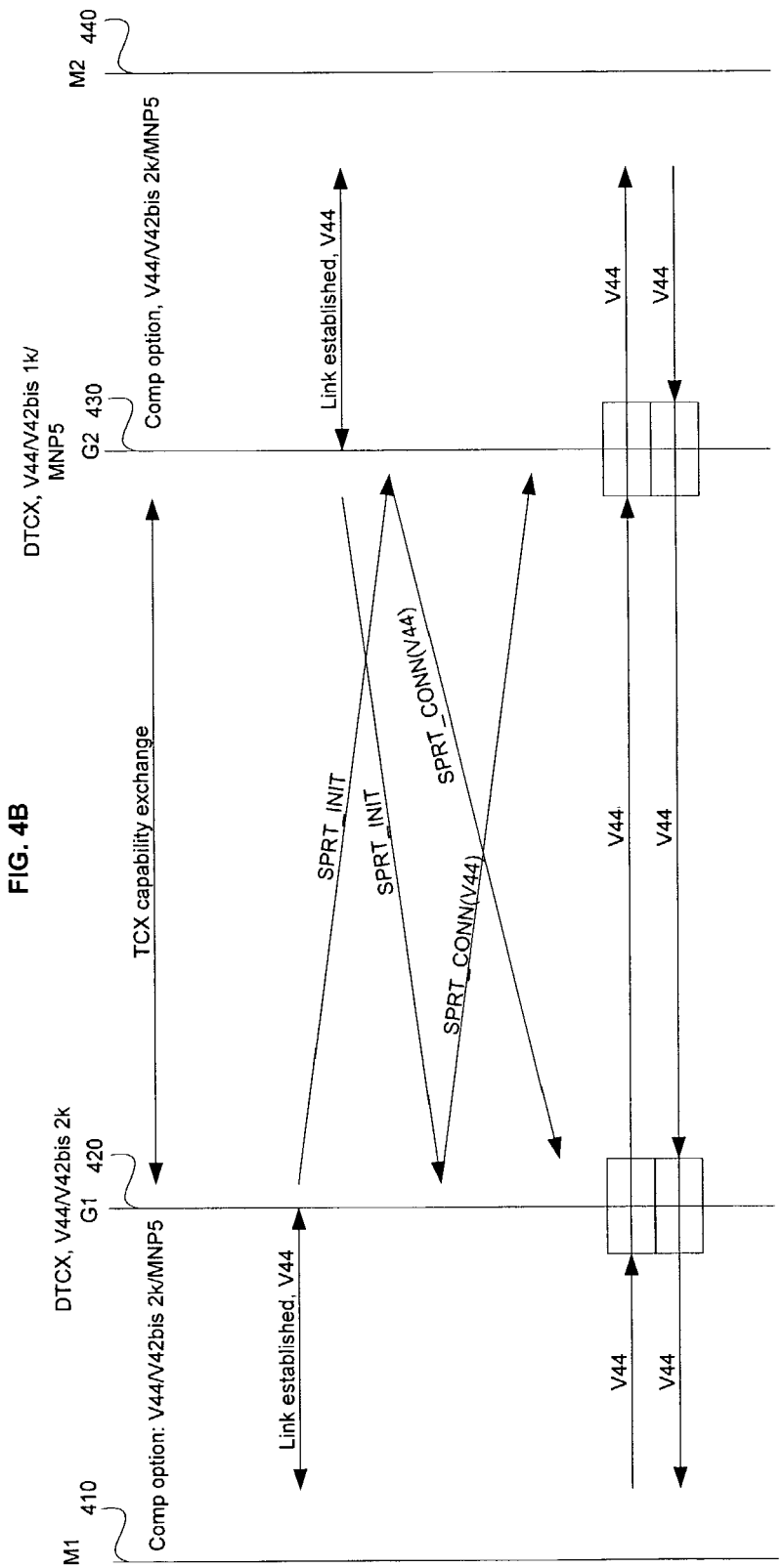

FIG. 4B depicts another example arrangement where G1 420 is of DTCX type and supports compression protocols V.44 and V.42bis 2 k, and G2 430 is of DTCX type and supports compression protocols V.44, V.42bis 1 k and MNP5. Since both G1 420 and G2 430 are of DTCX type, the same compression negotiation parameters using the maximum capability between G1 420 and G2 430 are defined for each. In this example, the highest compression capabilities of each of the supported compression capabilities (V.44, V.42bis 2 k, and MNP5) are used as the negotiation parameters. G1 420 and G2 430 then negotiate with its respective client modems (M1) 410, (M2) 440 using these defined compression negotiation parameters. As shown in FIG. 4B, an actual modem compression algorithm of V.44 is established for the M1-G1 link, while an actual modem compression algorithm of V.44 is established for the M2-G2 link. In this case, the highest common compression (V.44) for trans-compression between G1 420 and G2 430 is not used since in this case, as described above in conjunction with block 336i of FIG. 3-2, the highest common compression capability between G1 420 and G2 430 (V.44) is not a higher degree compression than the actual compression algorithm established between G1 420 and M1 410 (V.44) or between G2 430 and M2 440 (V.44). However, since for each gateway, each of the client modems coupled to other gateway are capable of decompressing the compressed data (V.44) sent by its local client modem, as described above in conjunction with block 336ii of FIG. 3-2, G1 420 and G2 430 are configured to not perform any trans-decompression or trans-compression of data as shown in FIG. 4B.

Figure 4C:
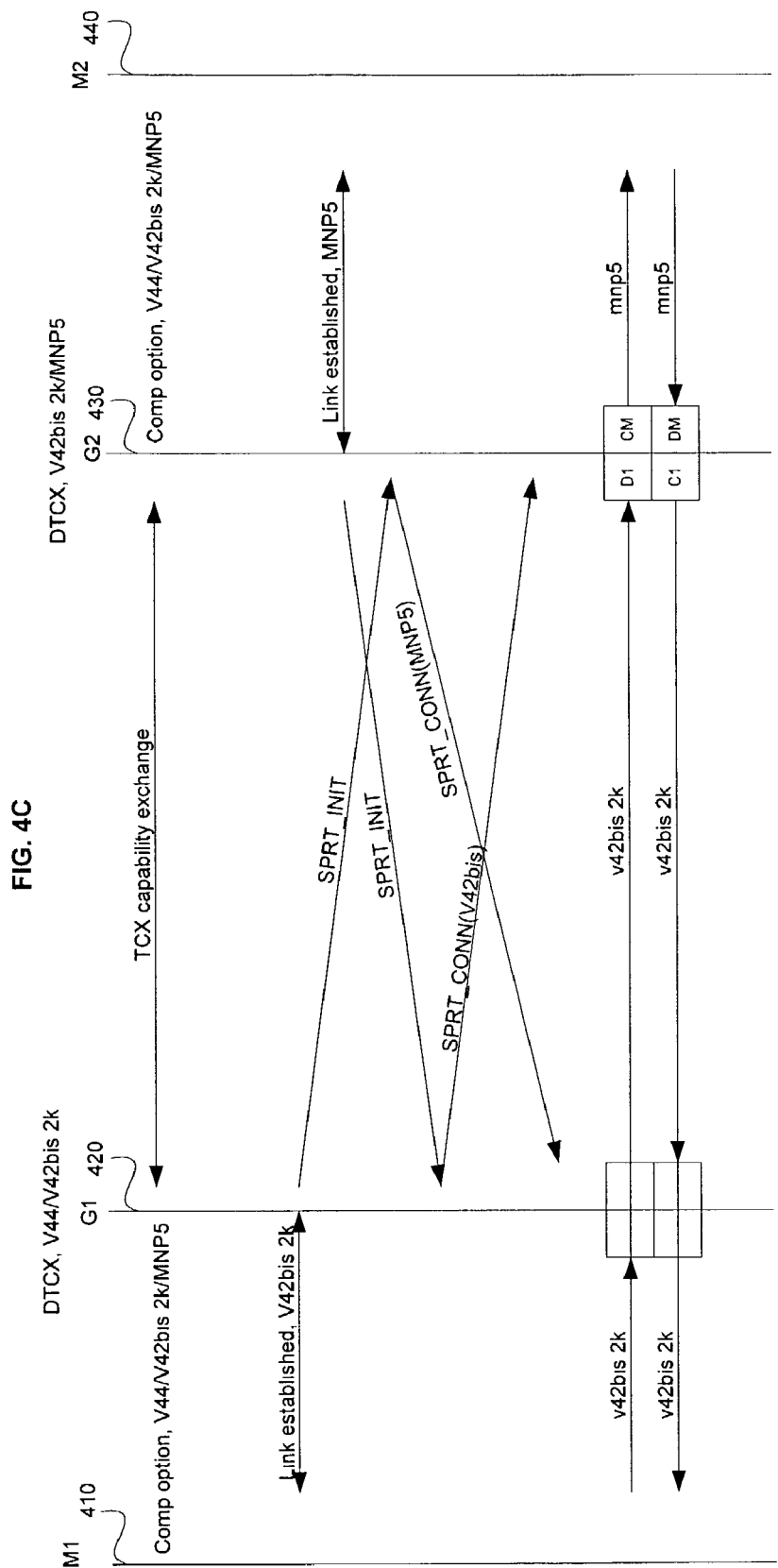

FIG. 4C depicts another example arrangement where G1 420 is of DTCX type and supports compression protocols V.44 and V.42bis 2 k, and G2 430 is of DTCX type and supports compression protocols V.42bis 2 k and MNP5. Since both G1 420 and G2 430 are of DTCX type, the same compression negotiation parameters using the maximum capability between G1 420 and G2 430 are defined for each. In this example, the highest compression capabilities of each of the supported compression capabilities (V.44, V.42bis 2 k, and MNP5) are used as the negotiation parameters. G1 420 and G2 430 then negotiate with its respective client modems (M1) 410, (M2) 440 using these defined compression negotiation parameters. As shown in FIG. 4C, an actual modem compression algorithm of V.42bis 2 k is established for the M1-G1 link, while an actual modem compression algorithm of MNP5 is established for the M2-G2 link. With respect to G1 420, the highest common compression (V.42bix 2 k) for trans-compression between G1 420 and G2 430 is not used since in this case, as described above in conjunction with block 336i of FIG. 3-2, the highest common compression capability between G1 420 and G2 430 (V.42bis 2 k) is not a higher degree compression than the actual compression algorithm established between G1 420 and M1 410 (V.42bis 2 k). With respect to G2 430, all the requirements of block 336i of FIG. 3-2 are satisfied; thus, the highest common compression algorithm between G1 420 and G2 430 (v.42bis 2 k) is used for the trans-compression operation of G2 430, as shown in FIG. 4C. Thus, G2 430 is configured to decompress the MNP5 data from M2 440 and to recompress the data using the V.42bis 2 k protocol prior to forwarding to G1 420.

Next, evaluating G1 420, it is determined that M2 440 coupled to the other gateway G2 430 is configured for MNP5 compression/decompression and is thus unable to decompress the V.42bis 2 k data transmitted to G1 420 by M1 410. Accordingly, the requirements described above in conjunction with block 336ii of FIG. 3-2, cannot be met. Next, it is determined that G1 420 is not capable of compressing data according to the actual compression algorithm established between G2 430 and M2 430 (MNP5) and therefore cannot meet the requirements described above in conjunction with block 336iii of FIG. 3-2. Accordingly, as described above in conjunction with block 336iv of FIG. 3-2, G1 420 is configured to forward data received from M1 410 to G2 430, where G2 430 decompresses the V.42bis 2 k data and recompresses the data using the MNP5 protocol prior to forwarding the data to M2 440 as shown in FIG. 4C.

Figure 4D:
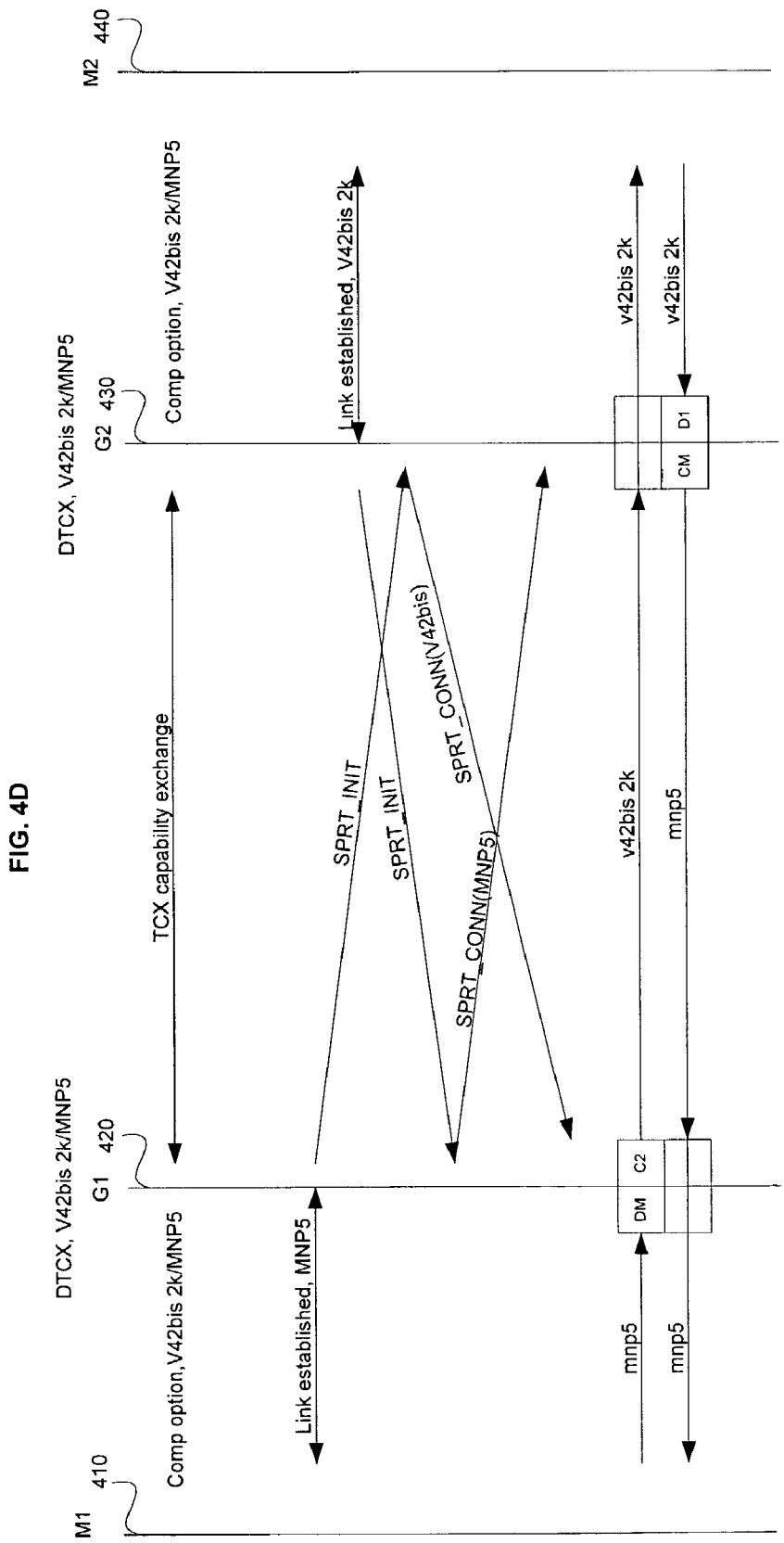

FIG. 4D depicts another example arrangement where G1 420 is of DTCX type and supports compression protocols V.42bis 2 k and MNP5, and G2 430 is of DTCX type and supports compression protocols V.42bis 2 k and MNP5. Since both G1 420 and G2 430 are of DTCX type, the same compression negotiation parameters using the maximum capability between G1 420 and G2 430 are defined for each. In this example, the highest compression capabilities of each of the supported compression capabilities (V.42bis 2 k and MNP5) are used as the negotiation parameters. G1 420 and G2 430 then negotiate with its respective client modems (M1) 410, (M2) 440 using these defined compression negotiation parameters. As shown in FIG. 4D, an actual modem compression algorithm of MNP5 is established for the M1-G1 link, while an actual modem compression algorithm of V.42bis 2 k is established for the M2-G2 link. With respect to G2 430, the highest common compression (V.42bis 2 k) for trans-compression between G1 420 and G2 430 is not used since in this case, as described above in conjunction with block 336i of FIG. 3-2, the highest common compression capability between G1 420 and G2 430 (V.42bis 2 k) is not a higher degree compression than the actual compression algorithm established between G2 430 and M2 440 (V.42bis 2 k). With respect to G1 420, all the requirements of block 336i of FIG. 3-2 are satisfied; thus, the highest common compression algorithm between G1 420 and G2 430 (v.42bis 2 k) is used for the trans-compression operation of G1 420, as shown in FIG. 4D. Thus, G1 420 is configured to decompress the MNP5 data from M1 410 and to recompress the data using the V.42bis 2 k protocol prior to forwarding to G2 430.

Next evaluating G2 430, it is determined that M1 410 coupled to the other gateway G1 420 is configured for NMP5 compression/decompression and is thus unable to decompress the v.42bis 2 k data transmitted to G2 430 by M2 440. Accordingly, the requirements described above in conjunction with block 336*ii* of FIG. 3-2, cannot be met. Turning next to the requirements described in conjunction with block 336*iii* of FIG. 3-2, evaluating G2 430, it is determined that G2 430 is able to decompress the data coming from M2 440 (V.42bis 2 k) and recompress the data according to the actual compression algorithm established between G1 420 and M1 410 (NMP5), and thus G2 430 is configured to decompress the data coming from M2 440 (V.42bis 2 k) and recompress the data according to the actual compression algorithm established between G1 420 and M1 410 (NMP5) as shown in FIG. 4D.

Figure 4E:
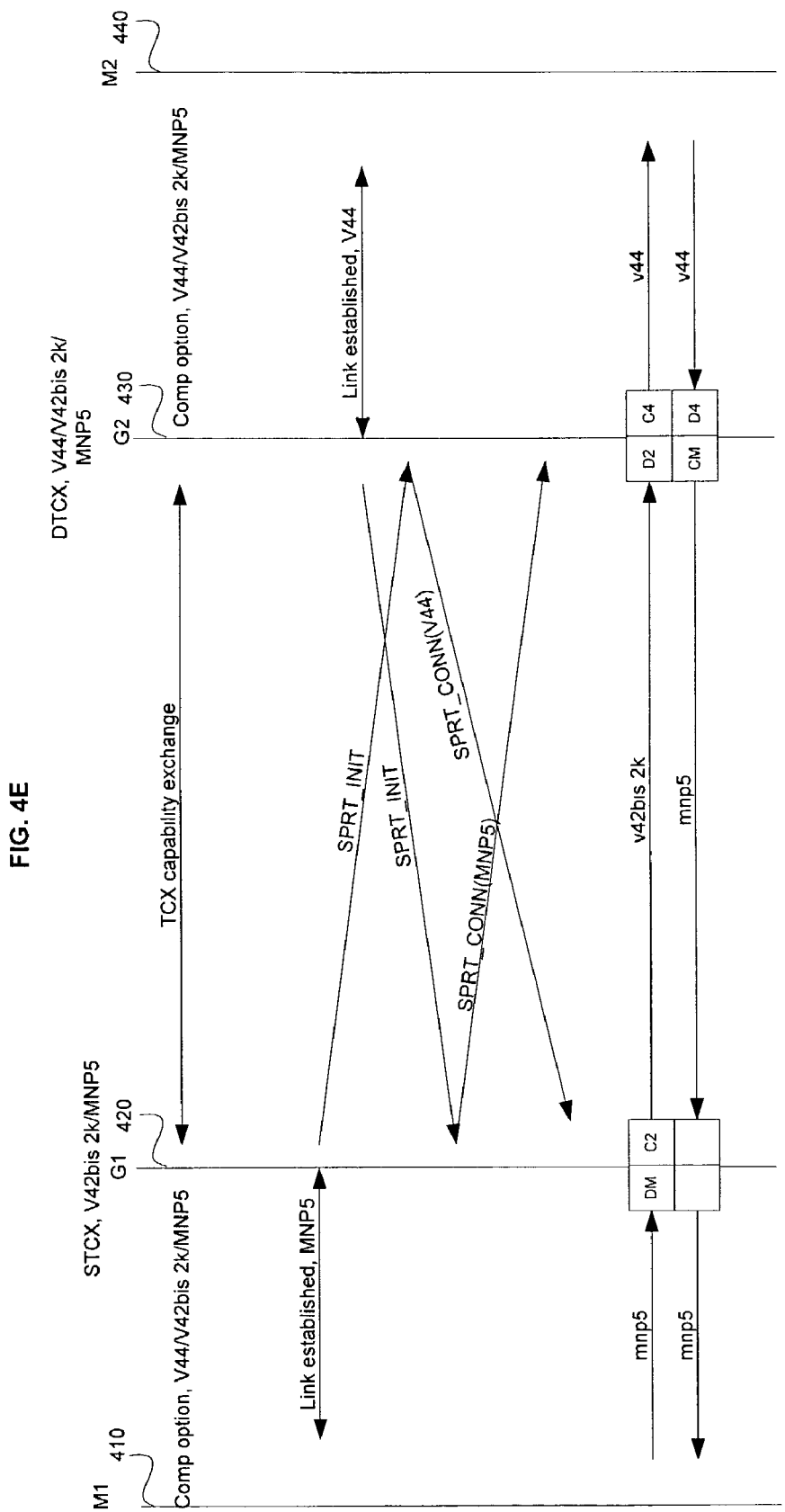

FIG. 4E depicts an example arrangement where G1 420 is of STCX type and supports compression protocols V.42bis 2 k and MNP5, and G2 430 is of DTCX type and supports compression protocols V.44, V.42bis 2 k and MNP5. Both G1 420 and G2 430 are not of DTCX type; therefore, the compression negotiation parameters of the DTCX gateway is defined for each of G1 420 and G2 430, as described above in conjunction with block 332 of FIG. 3-2. In this example, the compression capabilities of DTCX gateway G2 430 (V.44, V.42bis 2 k, and MNP5) are used as the negotiation parameters. G1 420 and G2 430 then negotiate with its respective client modems (M1) 410, (M2) 440 using these defined compression negotiation parameters. As shown in FIG. 4E, an actual modem compression algorithm of MNP5 is established for the M1-G1 link, while an actual modem compression algorithm of V.44 is established for the M2-G2 link. With respect to G2 430, the highest common compression (V.42bis 2 k) for trans-compression between G1 420 and G2 430 is not used since, as described above in conjunction with block 336*i* of FIG. 3-2, G1 420 is not of DTCX type. With respect to G1 420, all the requirements of block 336*i* of FIG. 3-2 are satisfied; thus, the highest common compression algorithm between G1 420 and G2 430 (v.42bis 2 k) is used as the trans-compression operation of G1 420, as shown in FIG. 4E. Thus, G1 420 is configured to decompress the MNP5 data from M1 410 and to recompress the data using the V.42bis 2 k protocol prior to forwarding to G2 430. Upon receipt, G2 430 then decompresses the V.42bis 2 k data from G1 420 and recompresses the data using the V.44 protocol prior to forwarding to M2 440.

Next, evaluating G2 430, it is determined that M1 410 coupled to the other gateway G1 420 is configured for MNP5 compression and is thus unable to decompress the V.44 data transmitted to G2 430 by M2 440. Accordingly, the requirements described above in conjunction with block 336*ii* of FIG. 3-2, cannot be met. However, G2 430 is able to decompress the data coming from M2 440 (V.44) and recompress the data according to the actual compression algorithm established between G1 420 and M1 410 (MNP5) as described above in conjunction with block 336*iii* of FIG. 3-2. Thus G2 430 is configured to decompress the data coming from M2 440 (V.44) and recompress the data according to the actual common compression algorithm between G1 420 and M2 410 (MNP5) as shown in FIG. 4E.

Figure 4F:
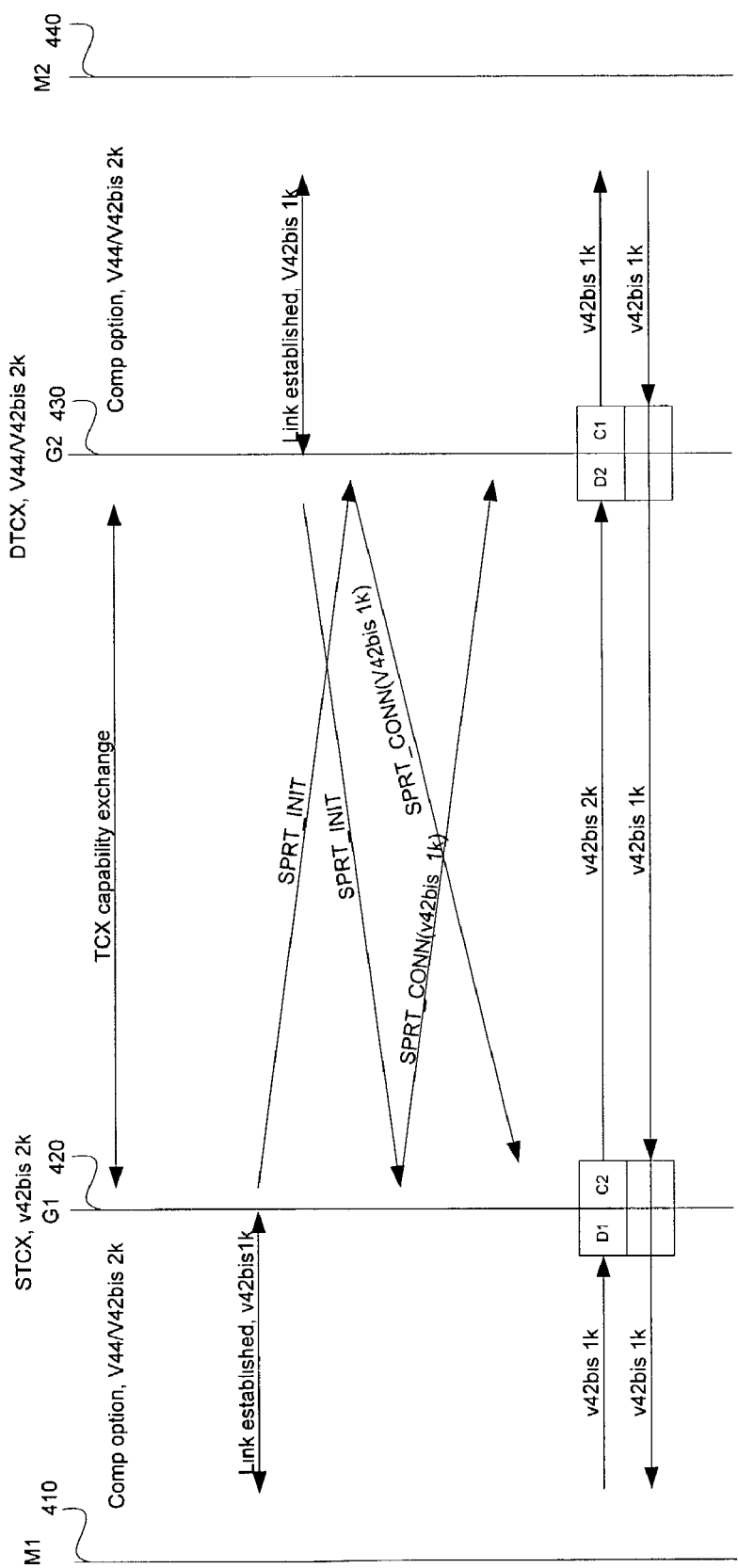

FIG. 4F depicts an example arrangement where G1 420 is of STCX type and supports compression protocol V.42bis 2 k, and G2 430 is of DTCX type and supports compression protocols V.44 and V.42bis 2 k. Both G1 420 and G2 430 are not of DTCX type; therefore, the compression negotiation parameters of the DTCX gateway is defined for each of G1 420 and G2 430, as described above in conjunction with block 332 of FIG. 3-2. In this example, the compression capabilities of DTCX gateway G2 430 (V.44 and V.42bis 2 k) are used as the negotiation parameters. G1 420 and G2 430 then negotiate with its respective client modems (M1) 410, (M2) 440 using these defined compression negotiation parameters. As shown in FIG. 4F, an actual modem compression algorithm of V42bis 1 k is established for the M1-G1 link, while an actual modem compression algorithm of V.42bis 1 k is established for the M2-G2 link. With respect to G2 430, the highest common compression (V.42bis 2 k) for trans-compression between G1 420 and G2 430 is not used since, as described above in conjunction with block 336*i* of FIG. 3-2, G1 420 is not of DTCX type.

Evaluating G1 420, all the requirements of block 336*i* of FIG. 3-2 are satisfied; thus, the highest common compression algorithm between G1 420 and G2 430 (v.42bis 2 k) is used for the trans-compression operation of G1 420, as shown in FIG. 4F. Thus, G1 420 is configured to decompress the V.42bis 1 k data from M1 410 and to recompress the data using the V.42bis 2 k protocol prior to forwarding to G2 430. Upon receipt, G2 430 decompresses the V.42bis 2 k data from M1 420 and recompresses the data using the V.42bis 1 k protocol prior to forwarding to M4 440.

Next evaluating G2 430 with respect to the requirements described above in conjunction with block 336*ii* of FIG. 3-2, it is determined that M1 410 coupled to the other gateway G1 420 is capable of decompressing the compressed data (V.42bis 1 k) sent by M2 440 to G2 430. Accordingly, G2 430 is configured to not perform any decompression or compression of data as shown in FIG. 4F for data transmitted by G2 440 to G2 430.

Figure 4G:
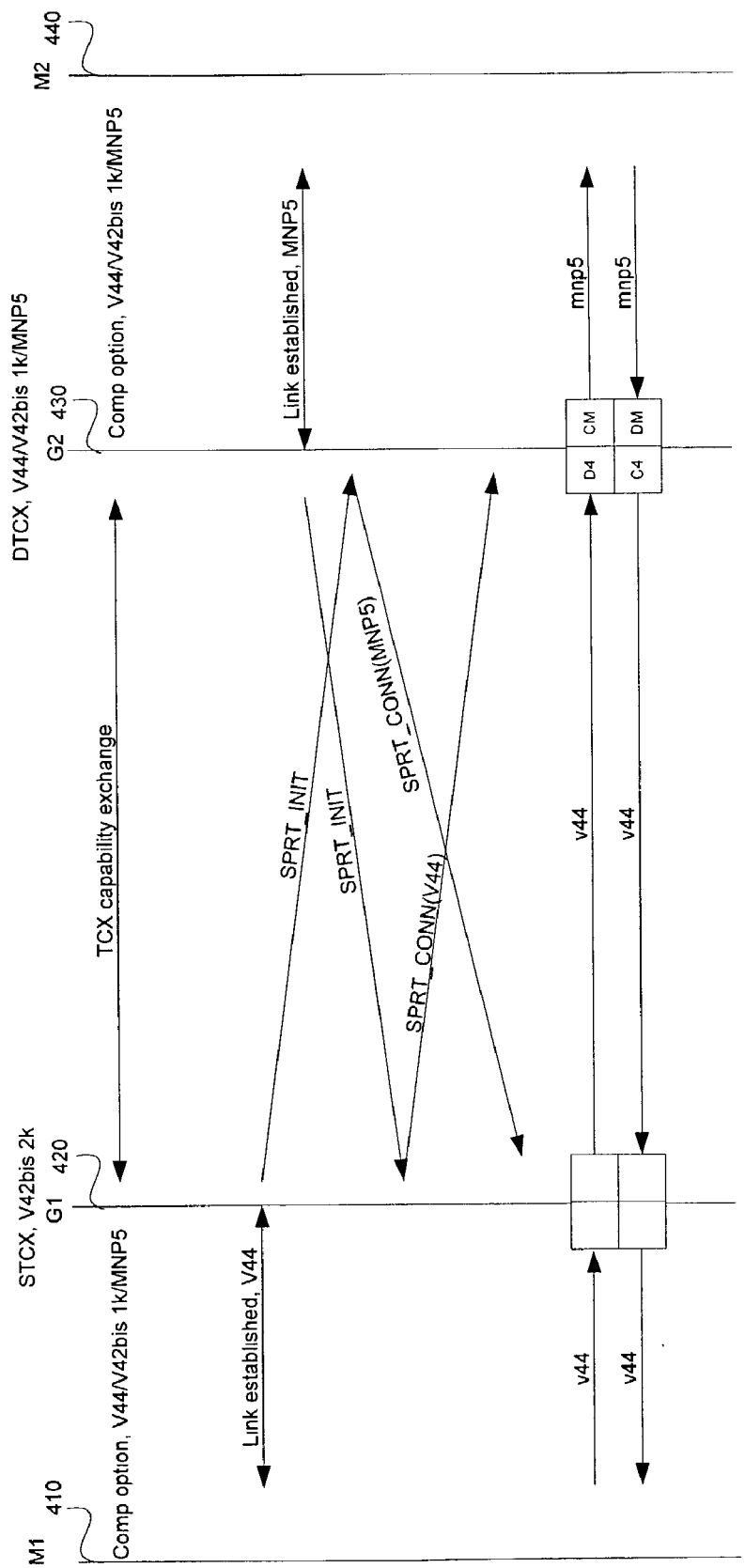

FIG. 4G depicts another example arrangement where G1 420 is of STCX type and supports compression protocol V.42bis 2 k, and G2 430 is of DTCX type and supports compression protocols V.44, V.42bis 1 k and MNP5. Both G1 420 and G2 430 are not of DTCX type; therefore, the compression negotiation parameters of the DTCX gateway is defined for each of G1 420 and G2 430, as described above in conjunction with block 332 of FIG. 3-2. In this example, the compression capabilities of DTCX gateway G2 (V.44, V.42bis 1 k, MNP5) are used as the negotiation parameters. G1 420 and G2 430 then negotiate with its respective client modems (M1) 410, (M2) 440 using these defined compression negotiation parameters. As shown in FIG. 4G, an actual modem compression algorithm of V.44 is established for the M1-G1 link, while an actual modem compression algorithm of MNP5 is established for the M2-G2 link. With respect to G1 420, the highest common compression (V.42bis 1 k) for trans-compression between G1 420 and G2 430 is not used since, as described above in conjunction with block 336*i* of FIG. 3-2, the compression capabilities of G1 420 (V.2bis 2 k) does not include the actual compression capabilities negotiated between G1 420 and M1 410 (V.44). With respect to G2 430, the highest common compression (V.42bis 1 k) for trans-compression between G1 420 and G2 430 is not used since, as described above in conjunction with block 336*i* of FIG. 3-2, G1 420 is not of DTCX type and the compression capabilities of G1 420 (V.2bis 2 k) does not include the actual compression capabilities negotiated between G1 420 and M1 410 (V.44).

Next, evaluating G1 420, it is determined that M2 440 coupled to the other gateway G2 430 is configured for MNP5 compression/decompression and is thus unable to decompress the V.44 data transmitted to G1 420 by M1 410. Evaluating G2 430, it is determined that M1 410 coupled to the other gateway G1 420 is configured for V.44 compression/decompression and is thus unable to decompress the MNP5 data transmitted to G2 430 by M2 440. Accordingly, the requirements described above in conjunction with block 336ii of FIG. 3-2, cannot be met. Next, it is determined that G1 420 is not capable of compressing data according to the actual compression algorithm established between G2 430 and M2 440 (MNP5) and therefore cannot meet the requirements described above in conjunction with block 336iii of FIG. 3-2. Accordingly, as described above in conjunction with block 336iv of FIG. 3-2, G1 420 is configured to forward data received from M1 410 to G2 430, where G2 430 decompresses the V.44 data and recompresses the data using the MNP5 protocol prior to forwarding the data to M2 440 as shown in FIG. 4G.

Evaluating G2 430, with respect to the requirements of block 336iii of FIG. 3-2, it is determined that G2 430 is capable of compressing data according to the actual compression algorithm established between G1 420 and M1 410 (V.44) and therefore meets the requirements described above in conjunction with block 336iii of FIG. 3-2. Accordingly, G2 430 is configured to decompress the MNP5 data from M2 440 and recompress the data using the V.44 protocol prior to forwarding the data to G1 420 as shown in FIG. 4G. Upon receipt of the V.44 data from G2 430, G1 420 forwards the data to M1 410 for decompression and further processing.

Figure 4H:
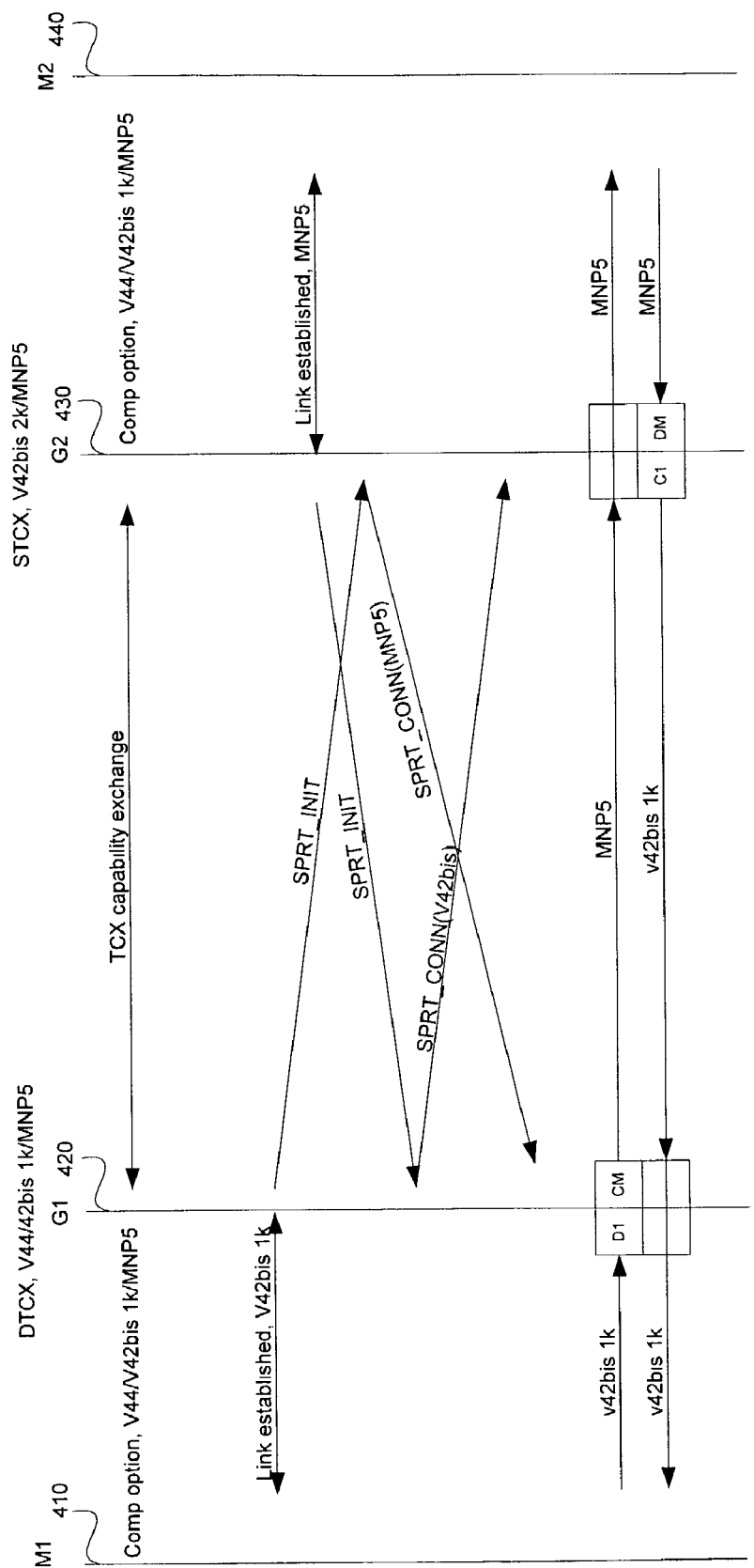

FIG. 4H depicts an example arrangement where G1 420 is of DTCX type and supports compression protocols V.44, V.42bis 1 k and MNP5, and G2 430 is of STCX type and supports compression protocols V.42bis 2 k and MNP5. Both G1 420 and G2 430 are not of DTCX type; therefore, the compression negotiation parameters of the DTCX gateway is defined for each of G1 420 and G2 430, as described above in conjunction with block 332 of FIG. 3-2. In this example, the compression capabilities of DTCX gateway G1 420 (V.44, V.42bis 1 k, MNP5) are used as the negotiation parameters. G1 420 and G2 430 then negotiate with its respective client modems (M1) 410, (M2) 440 using these defined compression negotiation parameters. As shown in FIG. 4H, an actual modem compression algorithm of V.42bis 1 k is established for the M1-G1 link, while an actual modem compression algorithm of MNP5 is established for the M2-G2 link. With respect to G1 420, the highest common compression (V.42bis 1 k) for trans-compression between G1 420 and G2 430 is not used since, as described above in conjunction with block 336i of FIG. 3-2, G2 430 is not of DTCX type. With respect to G2 430, all the requirements of block 336i of FIG. 3-2 are satisfied; thus, the highest common compression algorithm between G1 420 and G2 430 (v.42bis 1 k) is used for the trans-compression operation of G2 430, as shown in FIG. 4H. Thus, G2 430 is configured to decompress the MNP5 data from M2 and to recompress the data into V.42bis 1 k format prior to forwarding to G1 420.

Next, evaluating G1 420, it is determined that M2 440 coupled to the other gateway G2 430 is configured for MNP5 compression/decompression and is thus unable to decompress the V.44 data transmitted to G1 420 by M1 410. Accordingly, the requirements described above in conjunction with block 336ii of FIG. 3-2, cannot be met. Next, it is determined that G1 420 is capable of compressing data according to the actual compression algorithm established between G2 430 and M2 440 (MNP5) and therefore meets the requirements described above in conjunction with block 336iii of FIG. 3-2. Accordingly, G1 420 is configured to decompress the V.42bis 1 k data from M1 and recompress the data using the MNP5 protocol prior to forwarding the data to G2 430 as shown in FIG. 4H. Upon receipt of the MNP5 data from G1 420, G2 430 forwards the data to M2 440 for decompression and further processing.

Figure 4I:
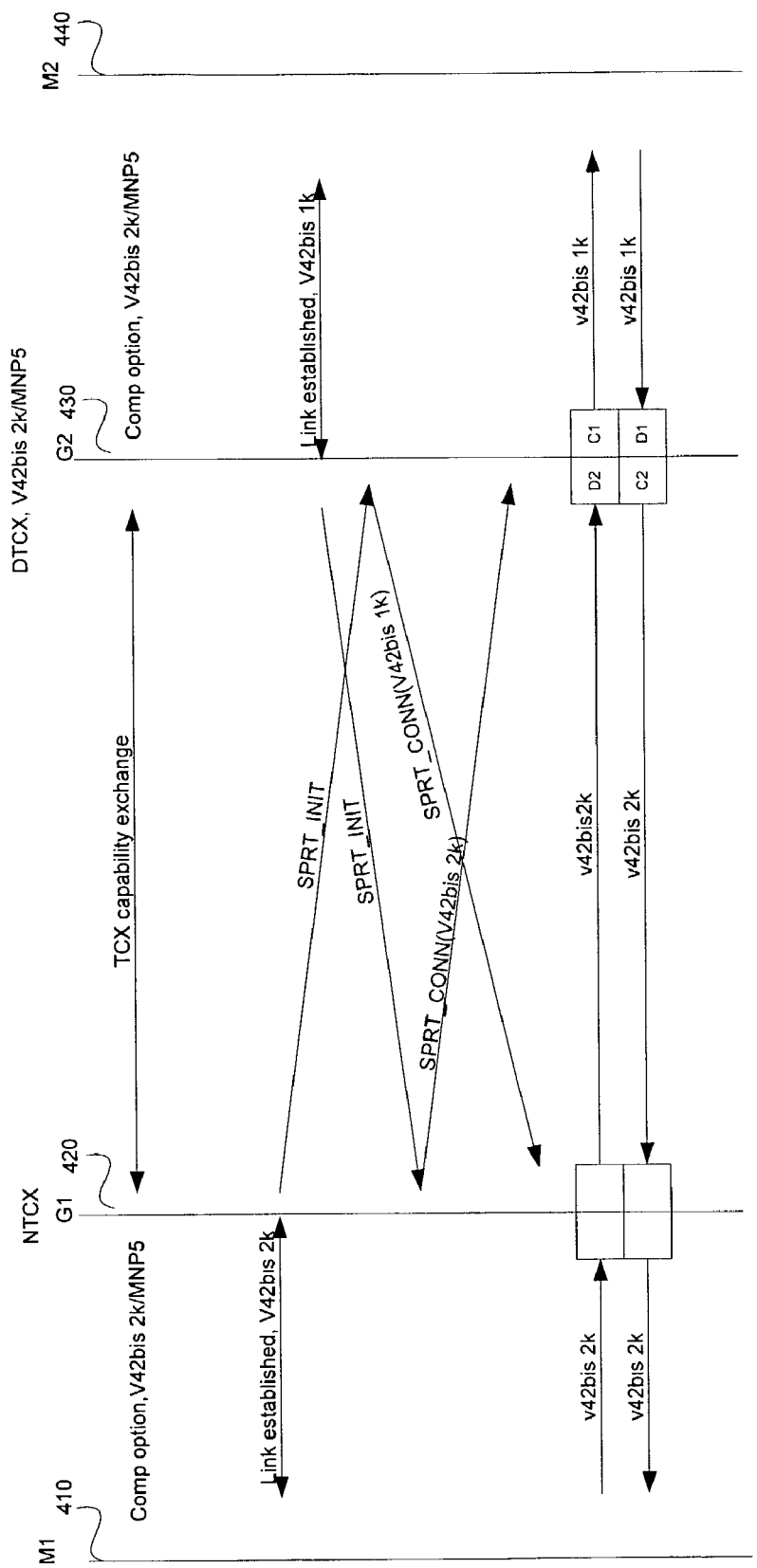

FIG. 4I depicts an example arrangement where G1 420 is of NTCX type and G2 430 is of DTCX type and supports compression protocols V.44, V.42bis 2 k and MNP5. Both G1 420 and G2 430 are not of DTCX type; therefore, the compression negotiation parameters of the DTCX gateway is defined for each of G1 420 and G2 430, as described above in conjunction with block 332 of FIG. 3-2. In this example, the compression capabilities of DTCX gateway G2 430 (V.44, V.42bis 2 k, MNP5) are used as the negotiation parameters. G1 420 and G2 430 then negotiate with its respective client modems (M1) 410, (M2) 440 using these defined compression negotiation parameters. As shown in FIG. 4I, an actual modem compression algorithm of V.42bis 2 k is established for the M1-G1 link, while an actual modem compression algorithm of V.42bis 1 k is established for the M2-G2 link. G1 420 does not support gateway trans-compression and thus the requirements described above in conjunction with block 336i of FIG. 3-2 cannot be satisfied.

Next, evaluating G1 420, it is determined that M2 440 coupled to the other gateway G2 430 is configured for V.42bis 1 k compression/decompression and is thus unable to decompress the v.42bis 2 k data transmitted to G1 420 by M1 420. Accordingly, the requirements described above in conjunction with block 336ii of FIG. 3-2, cannot be met. As noted above, G1 420 does not support trans-compression and thus cannot satisfy the requirements described above in conjunction with block 336iii of FIG. 3-2. Accordingly, G1 420 is configured to forward the V.42bis 2 k data to the other gateway G2 430 for processing. Upon receipt, G2 430 decompresses the V.42bis 2 k data and recompresses the data using the V.42bis 1 k protocol prior to forwarding to M2 440 as shown in FIG. 4I.

Evaluating G2 430, with respect to the requirements of block 336iii of FIG. 3-2, it is determined that G2 430 is capable of compressing data according to the actual compression algorithm established between G1 420 and M1 410 (V.42bis 2 k) and meets the requirements described above in conjunction with block 336iii of FIG. 3-2. Accordingly, G2 430 is configured to decompress the V.42bis 1 k data received from M2 440 and recompress the data using the V.42bis 2 k protocol prior to forwarding the data to G1 420 as shown in FIG. 4I. Upon receipt of the V.42bis 2 k data, G1 420 forwards the data to M1 410 for decompression and further processing.

Figure 4J:
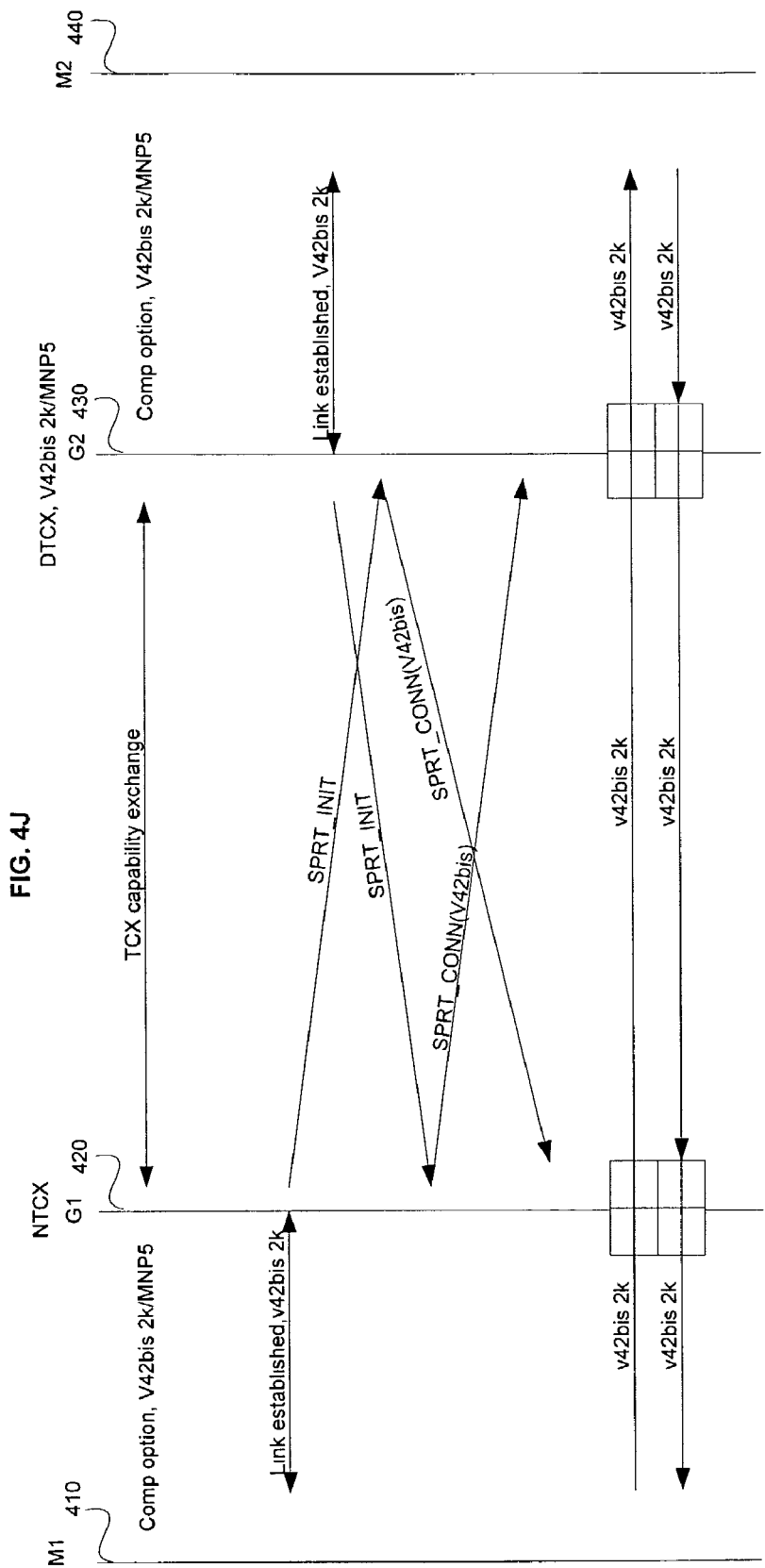

FIG. 4J depicts another example arrangement where G1 420 is of NTCX type and G2 430 is of DTCX type and supports compression protocols V.42bis 2 k and MNP5. Both G1 420 and G2 430 are not of DTCX type; therefore, the compression negotiation parameters of the DTCX gateway is defined for each of G1 420 and G2 430, as described above in conjunction with block 332 of FIG. 3-2. In this example, the compression capabilities of DTCX gateway G2 430 (V.42bis 2 k, MNP5) are used as the negotiation parameters. G1 420 and G2 430 then negotiate with its respective client modems (M1) 410, (M2) 440 using these defined compression negotiation parameters. As shown in FIG. 4J, an actual modem compression algorithm of V.42bis 2 k is established for the M1-G1 link, while an actual modem compression algorithm of V.42bis 2 k is established for the M2-G2 link. G1 420 does not support gateway trans-compression and thus the requirements described above in conjunction with block 336i of FIG. 3-2 cannot be satisfied for either G1 420 or G2 430.

However, since for each gateway, each of the client modems coupled to other gateway are capable of decompressing the compressed data (V.42bis 2 k) sent by local client modem, as described above in conjunction with block 336ii of FIG. 3-2, G1 420 and G2 430 are configured to not perform any decompression or compression of data as shown in FIG. 4J.

Figure 4K:
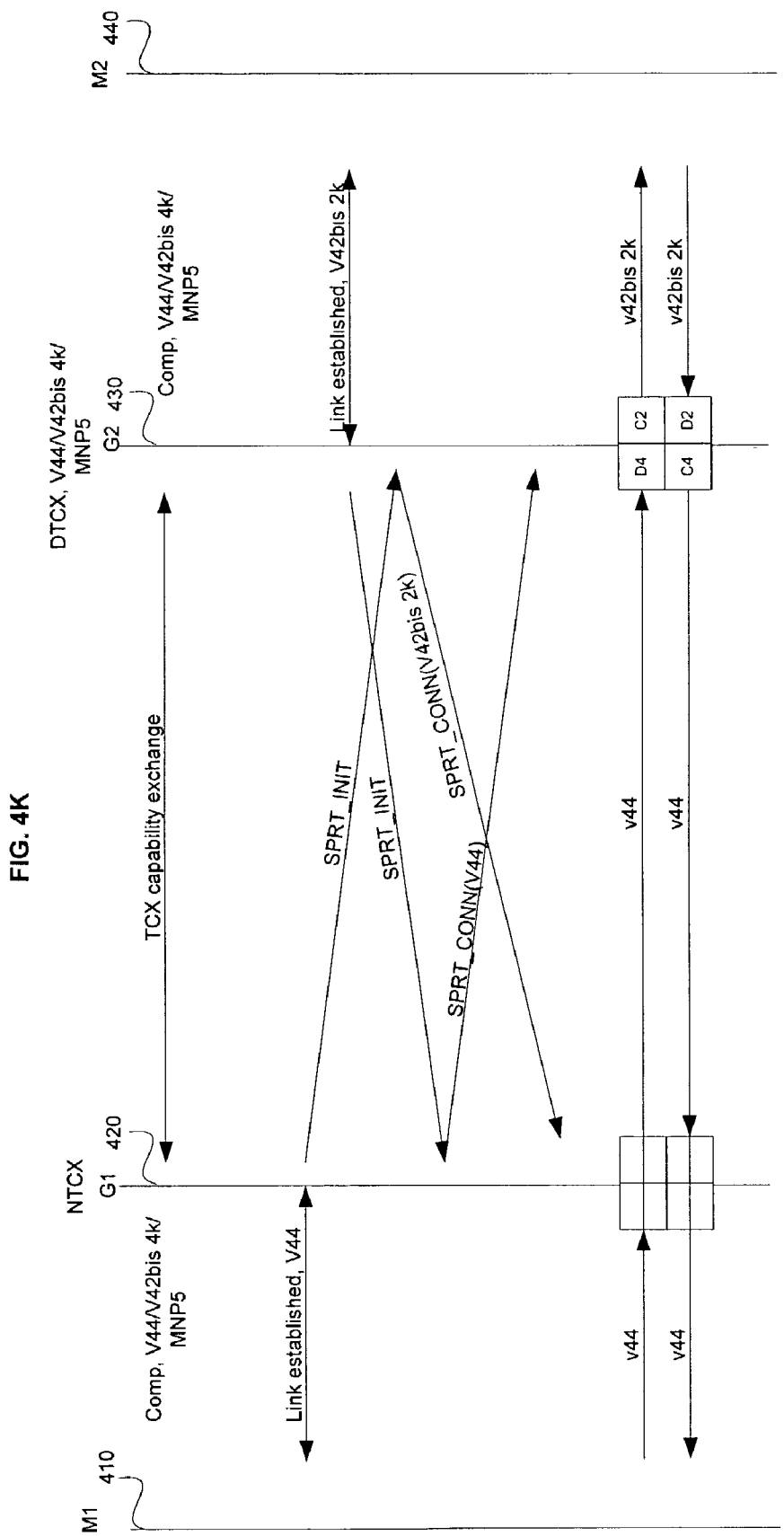

FIG. 4K depicts an example arrangement where G1 420 is of NTCX type and G2 430 is of DTCX type and supports compression protocols V.44, V.42bis 4 k and MNP5. Both G1 420 and G2 430 are not of DTCX type; therefore, the compression negotiation parameters of the DTCX gateway is defined for each of G1 420 and G2 430, as described above in conjunction with block 332 of FIG. 3-2. In this example, the compression capabilities of DTCX gateway G2 430 (V.44, V.42bis 4 k, MNP5) are used as the negotiation parameters. G1 420 and G2 then negotiate with its respective client modems (M1) 410, (M2) 440 using these defined compression negotiation parameters. As shown in FIG. 4K, an actual modem compression algorithm of V.44 is established for the M1-G1 link, while an actual modem compression algorithm of V.42bis 2 k is established for the M2-G2 link. G1 420 does not support gateway trans-compression and thus the requirements described above in conjunction with block 336i of FIG. 3-2 cannot be satisfied for either G1 420 or G2 430.

Next, evaluating G1 420, it is determined that M2 440 coupled to the other gateway G2 430 is configured for V.42bis 2 k compression and is thus unable to decompress the V.44 data transmitted to G1 420 by M1 410. Likewise, Evaluating G2 430, it is determined that M1 410 coupled to the other gateway G1 420 is configured for V.44 compression and is thus unable to decompress the V.42bis 2 k data transmitted to G2 430 by M2 440. Accordingly, the requirements described above in conjunction with block 336ii of FIG. 3-2, cannot be met. As noted above, G1 420 does not support trans-compression and thus cannot satisfy the requirements described above in conjunction with block 336iii of FIG. 3-2. Accordingly, G1 420 is configured to forward the V.44 data received from M1 410 to the other gateway G2 430 for processing. Upon receipt, G2 430 decompresses the V.44 data and recompresses the data using the V.42bis 2 k protocol prior to forwarding the data to M2 430.

Evaluating G2 430, with respect to the requirements of block 336iii of FIG. 3-2, it is determined that G2 430 is capable of compressing data according to the actual compression algorithm established between G1 420 and M1 410 (V.44) and therefore meets the requirements described above in conjunction with block 336iii of FIG. 3-2. Accordingly, G2 430 is configured to decompress the V.42bis 2 k data received from M2 440 and recompress the data using the V.44 protocol prior to forwarding the data to G1 420 as shown in FIG. 4K. Upon receipt of the V.44 data from G2 430, G1 420 forwards the data to M1 410 for decompression and further processing.

Figure 4L:
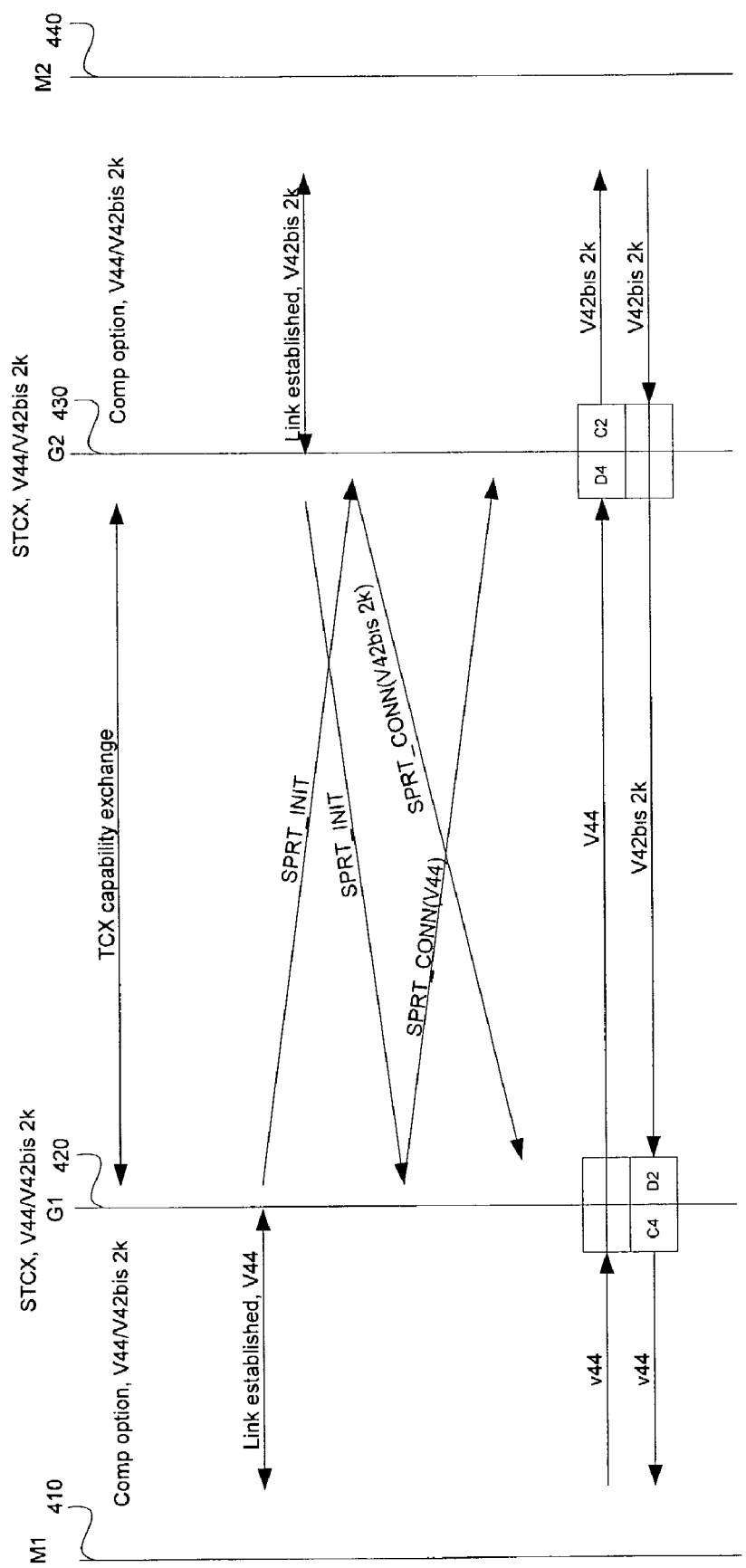

FIG. 4L depicts an example arrangement where G1 420 is of STCX type and supports compression protocols V.44 and V.42bis 2 k, and G2 430 is of STCX type and supports compression protocols V.44 and V.42bis 2 k. Neither gateway devices are of the DTCX type, but since both gateways device are of the STCX type, the gateways are configured in accordance with process blocks 338 through 346 as described above in conjunction with FIG. 3-3. Since G1 420 and G2 430 support a common compression algorithm (V.44 and V.42bis 2 k), the compression negotiation parameters comprising the common compression algorithm between G1 420 and G2 430 are defined for each of G1 420 and G2 430, as described above in conjunction with block 340 of FIG. 3-3. In this example, the common compression capabilities (e.g., V.44, V.42bis 2 k) are defined as the compression negotiation parameters. G1 420 and G2 430 then negotiate with its respective client modems (M1) 410, (M2) 440 using these defined compression negotiation parameters. As shown in FIG. 4L, an actual modem compression algorithm of V.44 is established for the M1-G1 link, while an actual modem compression algorithm of V.42bis 2 k is established for the M2-G2 link.

Since there is a common compression algorithm between G1 420 and G2 430 ($G1_{cap} \cap G2_{cap}$ is not NULL), G1 420 will be configured to forward the V.44 data received from M1 410 to G2 for decompression and compression to V.42bis 2 k by G2 430, and G2 430 will be configured to forward the V.42bis 2 k data received from M2 440 to G1 420 for decompression and compression to V.44 by G1 420 as described above in conjunction with block 346 of FIG. 3-3 and as depicted in FIG. 4L.

Figure 4M:
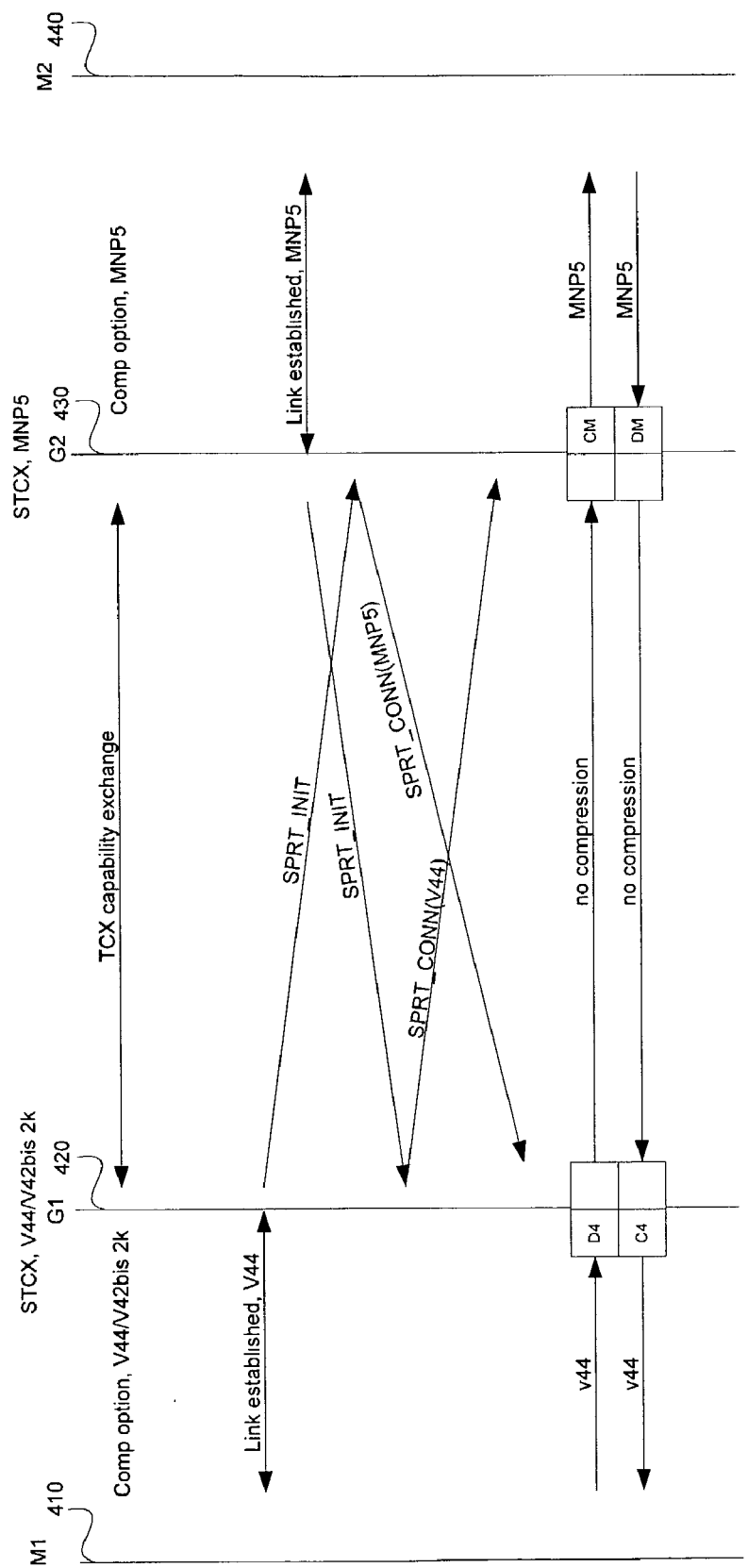

FIG. 4M depicts an example arrangement where G1 420 is of STCX type and supports compression protocols V.44 and V.42bis 2 k, and G2 430 is of STCX type and supports compression protocol MNP5. Neither gateway devices are of the DTCX type, but since both gateways device are of the STCX type, the gateways are configured in accordance with process blocks 338 through 346 as described above in conjunction with FIG. 3-3. Since G1 420 and G2 430 do not support a common compression algorithm, each of G1 420 and G2 430 will be defined compression negotiation parameters associated with its respective compression capabilities, as described above in conjunction with block 342 of FIG. 3-3. In this example, G1 420 will have negotiation parameters V.44 and V.42bis 2 k defined, and G2 430 will have negotiation parameters MNP5 defined. G1 420 and G2 430 then negotiate with its respective client modems (M1) 410, (M2) 440 using these defined compression negotiation parameters. As shown in FIG. 4M, an actual modem compression algorithm of V.44 is established for the M1-G1 link, while an actual modem compression algorithm of MNP5 is established for the M2-G2 link.

Since there is no common compression algorithm between G1 and G2 ($G1_{cap} \cap G2_{cap}$ is NULL), each gateway device will decompress the data coming from its near end client and send uncompressed data to the other gateway. The remote gateway will then compress the data in accordance with the established algorithm defined between the remote gateway and its associated client device as described above in conjunction with block 346 of FIG. 3-3. With respect to V.44 data transmitted by M1 410 to G1 420, G1 420 is configured to decompress the V.44 data and transmit the data to G2 430. Upon receipt, G2 430 is configured to compress the data received from G1 420 using the MNP5 protocol prior to forwarding the data to M2 440. With respect to MNP5 data transmitted by M2 440 to G2 430, G2 430 is configured to decompress the MNP5 data and transmit the data to G1 420. Upon receipt, G1 420 is configured to compress the data received from G2 430 using the V.44 protocol prior to forwarding the data to M1 410 as shown in FIG. 4M.

Figure 4N:
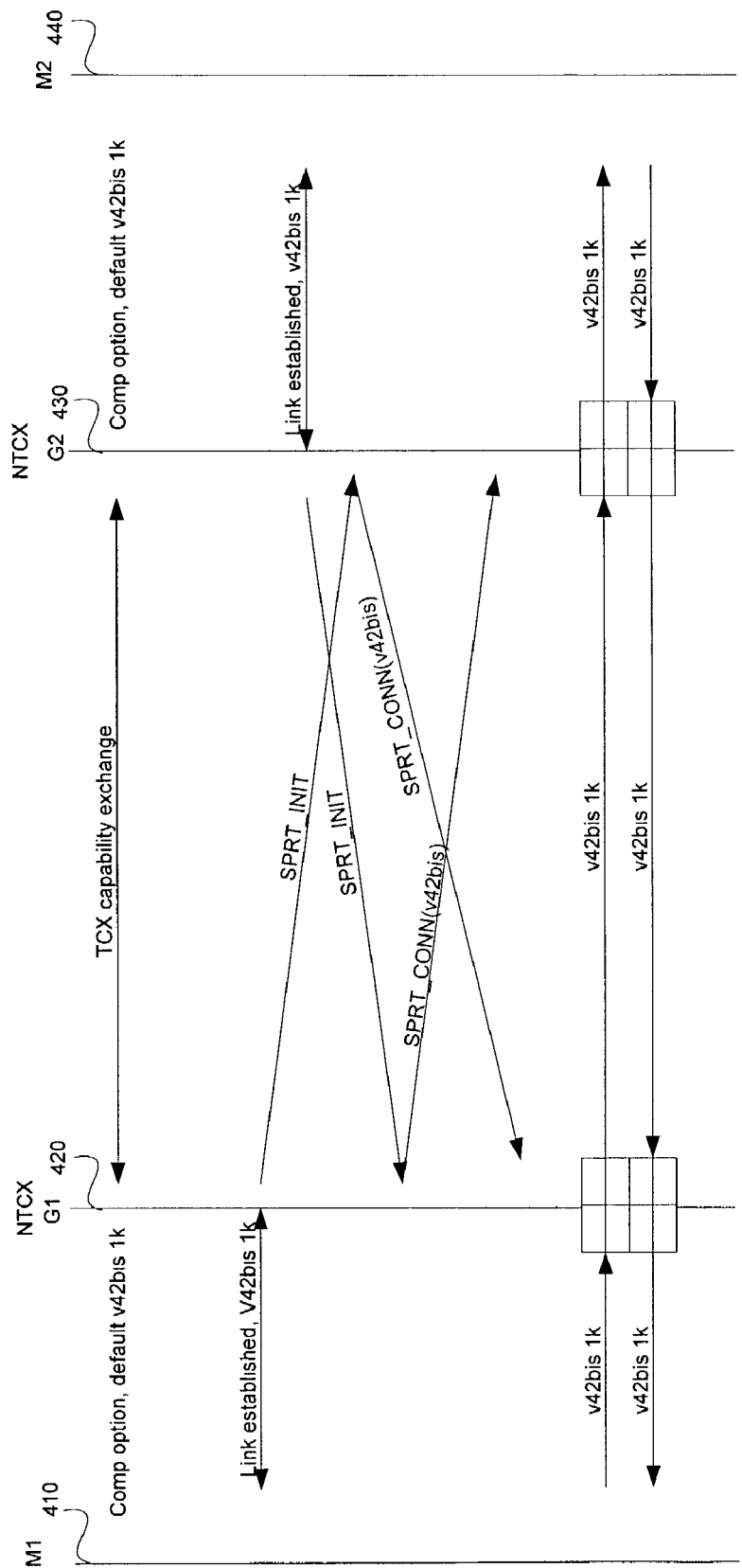
Figure 40:
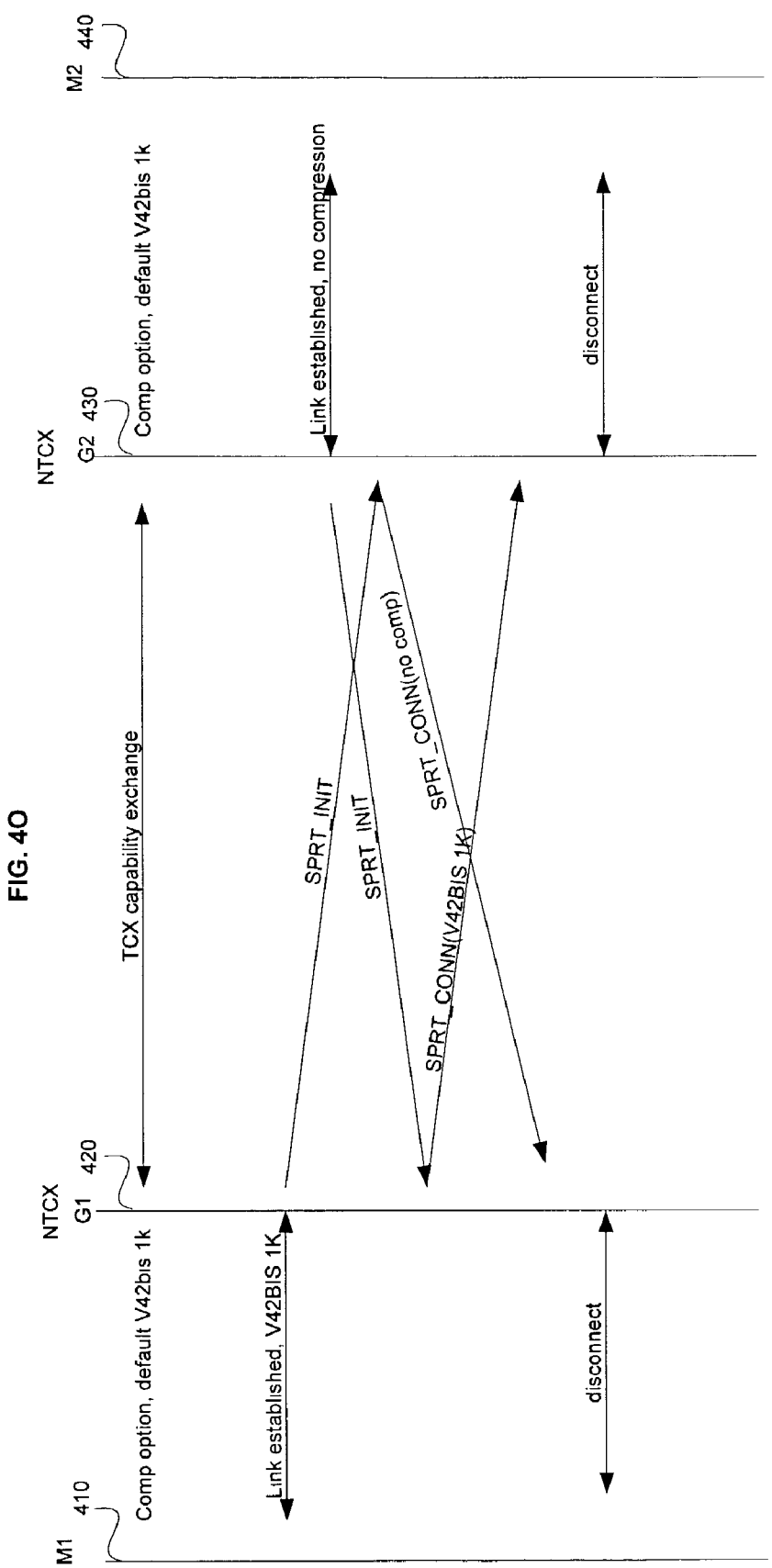

FIG. 4N depicts an example arrangement where G1 420 and G2 430 are both of NTCX type. Neither gateway devices are of the DTCX type, and both gateway devices are not of STCX type. Accordingly, the gateways are configured in accordance with block 348 as described above in conjunction with FIG. 3-3. In this case, default compression negotiation parameters are defined for each of G1 420 and G2 430. One example default compression option suitable for the negotiation parameters is V.42bis 1 k dictionary size with max string size of 32. G1 420 and G2 430 then negotiate with its respective client modems (M1) 410, (M2) 440 using these defined compression negotiation parameters. As shown in FIG. 4N, an actual modem compression algorithm of V.42bis 1 k is established for the M1-G1 link, while an actual modem compression algorithm of v.42bis 1 k is established for the M2-G2 link. Since the actual modem compression established between G1 420 and M1 410 is the same as that established between G2 430 and M2 440, the data packets may be forwarded end to end by each of G1 420 and G2 430 without any trans-compression between G1 420 and G2 430 as shown in FIG. 4N.

FIG. 4O depicts an example arrangement where G1 420 and G2 430 are both of NTCX type. Neither gateway devices are of the DTCX type, and both gateway devices are not of STCX type. Accordingly, the gateways are configured in accordance with block 348 as described above in conjunction with FIG. 3-3. In this case, default compression negotiation parameters are defined for each of G1 420 and G2 430. One example default compression option for negotiation parameters is V.42bis 1 k dictionary size with max string size of 32. G1 420 and G2 430 then negotiate with its respective client modems (M1) 410, (M2) 440 using these defined compression negotiation parameters. As shown in FIG. 4O, an actual modem compression algorithm of V.42bis 1 k is established for the M1-G1 link, while no modem compression is established for the M2-G2 link. Since the actual modem compression established between G1 420 and M1 410 is not the same as that established between G2 430 and M2 440, the connection is terminated as shown in FIG. 4O.

The methods and systems presented above may reside in software, hardware, or firmware on the device, which can be implemented on a microprocessor, digital signal processor, application specific IC, or field programmable gate array ("FPGA"), or any combination thereof, without departing from the spirit of the invention. Furthermore, the present invention may be embodied in other specific forms without departing from its spirit or essential characteristics. The described embodiments are to be considered in all respects only as illustrative and not restrictive.

What is claimed is:

1. A method for configuring a first gateway device, said first gateway device communicatively coupled to a first client device and a second gateway device, said second gateway device communicatively coupled to a second client device, said method comprising:
    determining a first trans-compression type of said first gateway device;
    receiving, from said second gateway, a second trans-compression type of said second gateway device;
    generating first negotiation parameters for said first gateway device based on said first and second trans-compression types; and
    negotiating using said first negotiation parameters with said first client device to select a first compression algorithm.

2. The method of claim 1, further comprising:
    receiving a second compression algorithm selected between said second gateway device and said second client device; and
    configuring said first gateway device based on said first and second trans-compression types and said first and second compression algorithms.

3. The method of claim 2, further comprising preventing data exchange between said first and second client devices until after said configuring said first gateway device.

4. The method of claim 1 further comprising:
    determining first trans-compression capabilities of said first gateway device; and
    receiving, from said second gateway, second trans-compression capabilities of said second gateway device,
    wherein said generating said first negotiation parameters for said first gateway device is based on said first and second trans-compression types and said first and second trans-compression capabilities.

5. The method of claim 1, wherein each of said first and second trans-compression types are at least one of: no trans-compression ("NTCX"), single trans-compression ("STCX"), or double trans-compression ("DTCX").

6. The method of claim 5, wherein said first negotiation parameters are defined according to whether at least one of said first and second gateway devices is of said DTCX type.

7. The method of claim 6, further comprising:
    determining first trans-compression capabilities of said first gateway device; and
    receiving, from said second gateway, second trans-compression capabilities of said second gateway device,
    wherein said first negotiation parameters are defined as a maximum gateway compression capabilities of said first and said second gateway devices if both of said first and said second gateway devices are of said DTCX type.

8. The method of claim 7, wherein said maximum compression capabilities comprises the highest gateway compression capabilities between said first and second gateway devices.

9. The method of claim 7, wherein said maximum compression capabilities comprises the highest gateway compression capabilities by combining the compression capabilities of said first and second gateway devices.

10. The method of claim 6, further comprising:
    determining first trans-compression capabilities of said first gateway device; and
    receiving, from said second gateway, second trans-compression capabilities of said second gateway device,
    wherein said first negotiation parameters are defined as the gateway compression capabilities of the one of said first and said second gateway devices which is of said DTCX type if one of said first and said second gateway devices is of said DTCX type but the other of said first and said second gateway devices is not of said DTCX type.

11. The method of claim 5, further comprising:
    receiving a second compression algorithm selected between said second gateway device and said second client device; and
    configuring said first gateway device based on said first and second trans-compression types and said first and second compression algorithms,
    wherein said first gateway device is configured according to whether at least one of said first and second gateway devices is of said DTCX type.

12. The method of claim 11, further comprising:
    determining first trans-compression capabilities of said first gateway device; and
    receiving, from said second gateway, second trans-compression capabilities of said second gateway device, wherein, if at least one of said first and second gateway devices is of said DTCX type, said first gateway device is configured to use said highest common gateway compression between said first and second gateway devices according to a first criteria, said first criteria satisfied if:
said second gateway device is of said DTCX type,
said compression capabilities of said first gateway device is a superset of said first compression algorithm,
said compression capabilities of said second gateway device is a superset of said second compression algorithm, and
said first gateway device and said second gateway device are able to negotiate a higher degree compression algorithm than said first compression algorithm.

13. The method of claim 12, wherein if said first criteria is not satisfied, said first gateway device is then configured to disable trans-compression between said first gateway and said second gateway according to a second criteria, said second criteria satisfied if said second client device is capable of decompressing compressed data sent by said first client device to said first gateway device.

14. The method of claim 13, wherein if both said first and second criteria are not satisfied, said first gateway device is then configured to:
decompress data received from said first client device,
compress said decompressed data according to said second compression algorithm, and
transmit said newly compressed data to said second gateway device, according to a third criteria, said third criteria satisfied if said first gateway device is capable of compressing data in accordance with said second compression algorithm.

15. The method of claim 14, wherein if each of said first, second and third criteria are not satisfied, said first gateway device is then configured to transmit data sent to said first gateway device by said first client device to said second gateway device.

16. The method of claim 5, wherein said first negotiation parameters are defined according to whether both of said first and second gateway devices are of said STCX type.

17. The method of claim 16, further comprising:
determining first trans-compression capabilities of said first gateway device; and
receiving, from said second gateway, second trans-compression capabilities of said second gateway device,
wherein said first negotiation parameters are defined as the common gateway compression capabilities between said first and said second gateway devices according to a first criteria, said first criteria satisfied if:
both of said first and said second gateway devices are of said STCX type,
said first and said second gateway devices have a common gateway compression capability, and
neither of said first and said second gateway devices are of said DTCX type.

18. The method of claim 17, wherein said first negotiation parameters are defined as the gateway compression capabilities of said first gateway device according to a second criteria, said second criteria satisfied if:
both of said first and said second gateway devices are of said STCX type,
said first and said second gateway devices do not have a common gateway compression capability, and
neither of said first and said second gateway devices are of said DTCX type.

19. The method of claim 18, further comprising:
receiving a second compression algorithm selected between said second gateway device and said second client device; and
configuring said first gateway device based on said first and second trans-compression types and said first and second compression algorithms,
wherein if said second criteria is satisfied, said first gateway device is configured to:
decompress data received from said first client device, and
transmit said uncompressed data to said second gateway device.

20. The method of claim 17, further comprising:
receiving a second compression algorithm selected between said second gateway device and said second client device; and
configuring said first gateway device based on said first and second trans-compression types and said first and second compression algorithms,
wherein if said first criteria is satisfied, said first gateway device is configured to transmit data received from said first client device to said second gateway device.

21. The method of claim 20, wherein if said first criteria is satisfied, said first gateway device is further configured to:
receive data from said second gateway device,
decompress said received data,
compress said uncompressed data using said first compression algorithm, and
transmit said newly compressed data to said first client device.

22. The method of claim 5, wherein said first negotiation parameters are configured to a default set according to a first criteria, said first criteria satisfied if:
at least one of said first and second gateway devices is not of said STCX type, and
neither of said first and said second gateway devices are of said DTCX type.

23. The method of claim 22, wherein said default set of negotiation parameters comprises V.42bis with 1 K dictionary size and a maximum string size of thirty two.

24. The method of claim 22, wherein if said first criteria is satisfied, said first gateway device is configured to forward data received from said first client device to said second gateway device if said first and second compression algorithms are the same.

25. The method of claim 22, wherein if said first criteria is not satisfied, said first gateway device is configured to disconnect connection between said first client and said first gateway if said first and second compression algorithms are not the same.

26. The method of claim 1, wherein said first client device is communicatively coupled to said first gateway device via a telephone connection, said second client device communicatively coupled to said second gateway device via another telephone connection, said first gateway device communicatively coupled to said second gateway device via a packet network.

27. The method of claim 1, further comprising performing compression negotiation by said first gateway device with said first client device for a compression protocol supported by said second gateway device, but not by said first gateway device.

28. A first gateway device, said first gateway device communicatively coupled to a first client device and a second gateway device, said second gateway device communicatively coupled to a second client device, said first gateway device comprising:
- a controller configured to determine a first trans-compression type of said first gateway device;
- a receiver coupled to said controller and configured to receive, from said second gateway, a second trans-compression type of said second gateway device; and
- a transmitter coupled to said controller, said controller further configured to generate first negotiation parameters for said first gateway device based on said first and second trans-compression types, said transmitter configured to negotiate with said first client device to select a first compression algorithm using said first negotiation parameters.

29. The first gateway device of claim 28, wherein said receiver is further configured to receive a second compression algorithm selected between said second gateway device and said second client device, said controller further configured to configure said first gateway device based on said first and second trans-compression types and said first and second compression algorithms.

30. The first gateway device of claim 29, wherein said controller is further configured to prevent data exchange between said first and second client devices until after said first gateway device is configured.

31. The first gateway device of claim 28, wherein said controller is further configured to:
- determine first trans-compression capabilities of said first gateway device, and
- receive, from said second gateway, second trans-compression capabilities of said second gateway device,
- wherein first negotiation parameters are based on said first and second trans-compression types and said first and second trans-compression capabilities.

32. The first gateway device of claim 28, wherein each of said first and second trans-compression types are at least one of: no trans-compression ("NTCX"), single trans-compression ("STCX"), or double trans-compression ("DTCX").

33. The first gateway device of claim 28, wherein said first client device is communicatively coupled to said first gateway device via a telephone connection, said second client device communicatively coupled to said second gateway device via another telephone connection, said first gateway device communicatively coupled to said second gateway device via a packet network.

34. The first gateway device of claim 28, wherein said controller is further to perform compression negotiation with said first client device for a compression protocol supported by said second gateway device but not by said first gateway device.

35. A computer readable storage medium having a computer program for use by a first gateway device, said first gateway device communicatively coupled to a first client device and a second gateway device, said second gateway device communicatively coupled to a second client device, said computer program comprising:
- code for determining a first trans-compression type of said first gateway device;
- code for receiving, from said second gateway, a second trans-compression type of said second gateway device;
- code for generating first negotiation parameters for said first gateway device based on said first and second trans-compression types; and
- code for negotiating using said first negotiation parameters with said first client device to select a first compression algorithm.

36. The computer readable storage medium of claim 35, said computer program further comprising:
- code for receiving a second compression algorithm selected between said second gateway device and said second client device; and
- code for configuring said first gateway device based on said first and second trans-compression types and said first and second compression algorithms.

37. The computer readable storage medium of claim 36, said computer program further comprising code for preventing data exchange between said first and second client devices until after said code for configuring configures said first gateway device.

38. The computer readable storage medium of claim 35, said computer program further comprising:
- code for determining first trans-compression capabilities of said first gateway device; and
- code for receiving, from said second gateway, second trans-compression capabilities of said second gateway device,
- wherein said code for generating generates said first negotiation parameters for said first gateway device is based on said first and second trans-compression types and said first and second trans-compression capabilities.

39. The computer readable storage medium of claim 35, wherein each of said first and second trans-compression types are at least one of: no trans-compression ("NTCX"), single trans-compression ("STCX"), or double trans-compression ("DTCX").

40. The computer readable storage medium of claim 35, wherein said first client device is communicatively coupled to said first gateway device via a telephone connection, said second client device communicatively coupled to said second gateway device via another telephone connection, said first gateway device communicatively coupled to said second gateway device via a packet network.

41. The computer readable storage medium of claim 35, wherein said computer program further comprises code for performing compression negotiation by said first gateway device with said first client device for a compression protocol supported by said second gateway device but not by said first gateway device.

* * * * *